United States Patent [19]

Lubowitz et al.

[11] Patent Number: 5,286,811
[45] Date of Patent: Feb. 15, 1994

[54] BLENDED POLYIMIDE OLIGOMERS AND METHOD OF CURING POLYIMIDES

[75] Inventors: Hyman R. Lubowitz, Rolling Hills Estates, Calif.; Clyde H. Sheppard, Bellevue, Wash.

[73] Assignee: The Boeing Company, Seattle, Wash.

[21] Appl. No.: 886,960

[22] Filed: May 21, 1992

Related U.S. Application Data

[60] Division of Ser. No. 353,588, May 18, 1989, Pat. No. 5,116,935, which is a continuation-in-part of Ser. No. 46,376, May 4, 1987, abandoned, which is a continuation-in-part of Ser. No. 715,801, Mar. 22, 1985, abandoned, which is a continuation-in-part of Ser. No. 536,264, Sep. 27, 1983, abandoned.

[51] Int. Cl.$^5$ ............... C08F 283/04; C08G 73/10; C08L 77/06
[52] U.S. Cl. .................... 525/422; 525/420; 525/425; 525/432; 525/434; 525/436; 428/288; 428/290; 428/473.5; 528/173; 528/331; 528/332
[58] Field of Search ............... 528/173, 125, 126, 128, 528/170-172, 183-185, 186, 188, 208, 220, 226, 229, 331, 322, 350-353; 525/425, 436, 434, 432, 420, 422; 428/288, 290, 473.5

[56] References Cited

U.S. PATENT DOCUMENTS

| | | | |
|---|---|---|---|
| 3,528,950 | 9/1970 | Lubowitz | 528/353 |
| 3,563,951 | 2/1971 | Radlmann et al. | 528/353 |
| 3,565,549 | 2/1971 | Lubowitz et al. | 117/126 |
| 3,745,149 | 7/1973 | Serafini et al. | 528/353 |
| 3,993,630 | 11/1976 | Darmory et al. | 528/353 |
| 3,998,786 | 12/1976 | D'Alelio | 528/353 |
| 4,055,543 | 10/1977 | D'Alelio | 528/353 |
| 4,075,171 | 2/1978 | D'Alelio | 528/353 |
| 4,142,870 | 3/1979 | Lovejoy | 51/298 |

(List continued on next page.)

FOREIGN PATENT DOCUMENTS

WO84/04313 4/1983 PCT Int'l Appl.

OTHER PUBLICATIONS

St. Clair et al., "Additives Lower Pickup of Moisture by Polyimides", NASA Tech Briefs, Apr. 1989, p. 28.
Vannucci "PMR Polyimide Compositions for Improved Performance at 371° C.", NASA Tech Memorandum No. NASA TM-88942, Catalog No. N87-16071, Apr. 1987.

*Primary Examiner*—John Kight, III
*Assistant Examiner*—P. Hampton-Hightower
*Attorney, Agent, or Firm*—Senniger, Powers, Leavitt & Roedel

[57] ABSTRACT

A preferred class of polyimide oligomers include (1) linear, difunctional crosslinking oligomers prepared by condensing an imidophenylamine end cap with a lower alkylene diamine or a polyaryldiamine such as 3,3'-phenoxyphenylsulfone diamine and with a dianhydride, particularly 4,4'-phenoxyphenylsulfone dianhydride; and (2) multidimensional, crosslinking, polyimide oligomers having an aromatic hub and at least two radiating arms connected to the hub, each arm including a crosslinking imidophenylamine end cap at its distal end and at least two imide linkages.

Blends, prepregs, and composites can be prepared from the oligomers.

Also described is a method for improving the thermal stability of composites prepared from linear and multi-dimensional polyimide oligomers and blends which includes the steps of (a) impregnating a fabric with a polyimide oligomer or blend to form a prepreg; (b) heating the prepreg at an elevated temperature and under pressure for a time sufficient to cure the prepreg and form a composite; and (c) post-curing the composite at a temperature of approximately 700° F. and for a time sufficient to improve the thermal stability thereof.

12 Claims, No Drawings

OTHER PUBLICATIONS

| | | | |
|---|---|---|---|
| 4,244,853 | 1/1981 | Serafini et al. | 528/353 |
| 4,251,417 | 2/1981 | Chow et al. | 528/353 |
| 4,251,418 | 2/1981 | Chow et al. | 528/353 |
| 4,251,419 | 2/1981 | Heilman | 528/353 |
| 4,251,420 | 2/1981 | Antonoplos et al. | 528/353 |
| 4,271,079 | 6/1981 | Maeda et al. | 528/353 |
| 4,299,946 | 11/1981 | Blame et al. | 528/128 |
| 4,376,710 | 3/1983 | Gardos et al. | 252/12.4 |
| 4,381,363 | 4/1983 | Reinhart, Jr. | 524/324 |
| 4,389,504 | 6/1983 | St. Clair et al. | 524/233 |
| 4,414,269 | 11/1983 | Lubowitz et al. | 428/290 |
| 4,417,039 | 11/1983 | Reinhardt et al. | 526/285 |
| 4,417,044 | 11/1983 | Parekh | 528/179 |
| 4,418,181 | 11/1983 | Monacelli | 525/426 |
| 4,438,280 | 3/1984 | Monacelli | 562/457 |
| 4,476,184 | 10/1984 | Lubowitz et al. | 428/288 |
| 4,579,957 | 4/1986 | Kanayama et al. | 548/421 |
| 4,604,437 | 9/1986 | Renner | 526/262 |
| 4,624,888 | 11/1986 | St. Clair et al. | 428/262 |
| 4,675,414 | 6/1987 | DeFusco et al. | 548/521 |
| 4,680,377 | 7/1987 | Matsumura et al. | 528/322 |
| 4,684,714 | 8/1987 | Lubowitz et al. | 528/353 |
| 4,695,610 | 9/1987 | Egli et al. | 525/426 |
| 4,772,722 | 9/1988 | Lukacs, III | 548/413 |
| 4,851,501 | 7/1989 | Lubowitz et al. | 528/170 |
| 4,868,270 | 9/1989 | Lubowitz et al. | 528/170 |
| 4,876,328 | 10/1989 | Lubowitz et al. | 528/322 |

BLENDED POLYIMIDE OLIGOMERS AND METHOD OF CURING POLYIMIDES

REFERENCE TO RELATED APPLICATIONS

This application is a divisional application of U.S. Ser. No. 07/353,588, filed May 18, 1989, now U.S. Pat. No. 5,116,935 which is a continuation-in-part application based upon U.S. Ser. No. 07/046,376, filed May 4, 1987, now abandoned which is a continuation-in-part application based upon U.S. Ser. No. 06/715,801, filed Mar. 22, 1985, now abandoned, which was a continuation-in-Part application based upon U.S. Ser. No. 06/536,264, filed Sep. 27, 1983, now abandoned.

TECHNICAL FIELD

The present invention relates to linear and multidimensional polyimide oligomers that include mono- or difunctional crosslinking end cap (terminal) groups. Cured composites of these oligomers display improved toughness, solvent-resistance, and thermal stability. The oligomers include backbones comprised of alternating residues of diamines and dianhydrides. The diamines generally include aryl radicals linked by alternating ether and "sulfone" linkages. Particularly preferred oligomers include a difunctional crosslinkable imidophenylamine end cap and 4,4'-phenoxyphenylsulfone dianhydride residues.

Blends are prepared from mixtures of the crosslinking oligomers and a compatible, noncrosslinking, polymer.

The invention also includes a method for improving the thermal stability of composites prepared from polyimide oligomers by post-curing said composites for a suitable time at a temperature of approximately 700° F.

BACKGROUND ART

Thermosetting resins that are commonly used in fiber-reinforced composites cannot be reshaped after thermoforming. Errors in forming cannot be corrected, so these thermosetting resins are undesirable in many applications.

Although thermoplastic resins are well known, the use of fiber-reinforced thermoplastic resins is a relatively new art. Fiber toughens and stiffens the thermoplastic resin to produce high-performance composite products. A sheet of fiber-reinforced resin can be heated and then stamped into a desired shape with appropriate dies. The shape can be altered thereafter, if desired.

Thermoplastic resins commonly have a tendency to be weakened by organic solvents. Accordingly, circuit boards formed from conventional, fiber-reinforced thermoplastic resin composites usually cannot be cleaned with solvents that are commonly used in the aerospace industry. In structural aircraft applications, care must also be taken to eliminate contact between the composites and hydraulic or cleaning fluids. At moderate or high temperatures, many fiber-reinforced thermoplastic composites lose their abilities to carry load due to softening of the resin. Thus, improved thermal stability and solvent-resistance are desirable to fulfill the existing needs for advanced composites. The oligomers of the present invention provide such polyimide composites when they are cured.

Recently, chemists have sought to synthesize oligomers for high performance advanced composites suitable for aerospace applications. These composites should exhibit solvent resistance, toughness, impact resistance, ease of processing, and strength, and should be thermoplastic. Oligomers and composites that have thermooxidative stability and, accordingly, can be used at elevated temperatures are particularly desirable.

While epoxy-based composites are suitable for many applications, their brittle nature and susceptibility to degradation make them inadequate for many aerospace applications, especially those applications which require thermally stable, tough composites. Accordingly, research has recently focused on polyimide composites to achieve an acceptable balance between thermal stability, solvent resistance, and toughness. Still the maximum temperatures for use of the polyimide composites, such as PMR-15, are about 600°–625° F., since they have glass transition temperatures of about 690° F.

There has been a progression of polyimide sulfone compounds synthesized to provide unique properties or combinations of properties. For example, Kwiatkowski and Brode synthesized maleic capped linear polyarylimides as disclosed in U.S. Pat. No. 3,839,287. Holub and Evans synthesized maleic or nadic capped imido-substituted polyester compositions as disclosed in U.S. Pat. No. 3,729,446. Monacelli proposed tetra-maleimides made through an amic acid mechanism with subsequent ring closure, as shown in U.S. Pat. Nos. 4,438,280 or 4,418,181. We synthesized thermally stable polysulfone oligomers as disclosed in U.S. Pat. No. 4,476,184 or U.S. Pat. No. 4,536,559, and have continued to make advances with polyetherimidesulfones, polybenzoxazolesulfones, polybutadienesulfones, and "star" or "starburst" multidimensional oligomers. We have shown surprisingly high glass transition temperatures yet reasonable processing and desirable physical properties in many of these oligomers and their composites.

Polybenzoxazoles (or their corresponding heterocycles), such as those disclosed in our copending applications U.S. Ser. No. 07/116,592, now U.S. Pat. No. 4,965,336 (to Lubowitz & Sheppard) and Ser. No. 07/121,964, now U.S. Pat. No. 4,868,270 (to Lubowitz, Sheppard, and Stephenson), may be used at temperatures up to about 750°–775° F., since these composites have glass transition temperatures of about 840° F. Some aerospace applications need composites which have even higher use temperatures while maintaining toughness, solvent resistance, ease of processing, formability, strength, and impact resistance.

Multidimensional oligomers, such as disclosed in our copending applications U.S. Ser. Nos. 07/000,605, filed Jan. 5, 1987; 07/167,656, now U.S. Pat. No. 5,210,213, filed Mar. 14, 1988, and Ser. No. 07/176,518, filed Apr. 1, 1988, have superior processability than some advanced oligomers since they can be handled at lower temperatures. Upon curing, however, the phenylimide and caps crosslink so that the thermal resistance and stiffness of the resulting composite is markedly increased. This increase is obtained with only a minor loss of matrix stress transfer (impact resistance), toughness, elasticity, and other mechanical Properties. Glass transition temperatures above 850° F. are achievable.

Commercial polyesters, when combined with well-known reactive diluents, such as styrene, exhibits marginal thermal and oxidative resistance, and are useful only for aircraft or aerospace interiors. Polyarylesters are often unsatisfactory, also, since the resins often are semicrystalline which may make them insoluble in useable laminating solvents, intractable in fusion under typical processing conditions, and difficult and expensive to manufacture because of shrinking and/or warping. Those polyarylesters that are soluble in conventional laminating solvents remain so in composite form, thereby limiting their usefulness in structural composites. The high concentration of ester groups contributes to resin strength and tenacity, but also to make the resin susceptible to the damaging effects of water absorption. High moisture absorption by commercial polyesters can lead to lowering of the glass transition temperature leading to distortion of the composite when it is loaded at elevated temperature.

High performance, aerospace, polyester advanced composites, however, can be Prepared using crosslinkable, end-capped polyester imide ether sulfone oligomers that have an acceptable combination of solvent resistance, toughness, impact resistance, strength, ease of processing, formability, and thermal resistance. By including Schiff base (—CH=N—) linkages in the oligomer chain, the linear, advanced composites formed with polyester oligomers of our copending application U.S. Ser. No. 07/137,493, filed Dec. 23, 1987 can have semiconductive or conductive properties when appropriately doped or reacted with appropriate metal salts.

Conductive and semiconductive plastics have been extensively studies (see, e.g., U.S. Pat. Nos. 4,375,427; 4,338,222; 3,966,987; 4,344,869; and 4,344,870), but these polymers do not possess the blend of properties which are essential for aerospace applications. That is, the conductive polymers do not Possess the blend of (1) toughness, (2) stiffness, (3) ease of processing, (4) impact resistance (and other matrix stress transfer capabilities), (5) retention of properties over a broad range of temperatures, and (6) thermooxidative resistance that is desirable on aerospace advanced composites. The prior art composites are often too brittle.

Thermally stable multidimensional oligomers having semiconductive or conductive properties when doped with suitable dopants are also known and are described in our copending applications (including U.S. Ser. No. 06/773,381, filed Sep. 5, 1985 and Ser. No. 07/212,404, filed Jun. 27, 1988 to Lubowitz, Sheppard and Torre): The linear arms of the oligomers contain conductive linkages, such as Schiff base (—N=CH—) linkages, between aromatic groups. Sulfone and ether linkages are interspersed in the arms. Each arm is terminated with a mono- or difunctional end cap to allow controlled crosslinking upon heat-induced or chemical-induced curing.

SUMMARY OF THE INVENTION

The present invention is directed to a family of polyimide thermoplastic resins or oligomers that produce composites that exhibit thermal stability, are readily processed, and are resistant to attack by organic solvents. The preferred oligomers have linear backbones with imide linkages along the polymer backbone contributing to the ability of the resins to carry mechanical loads at moderately high temperatures. Sulfone (—SO$_2$—), ether (—O—) or other electronegative linkages between aromatic groups provide improved toughness. Such preferred resins resist chemical stress corrosion, can be thermoformed, are chemically stable and, in addition, are processible at relatively low temperatures. In accordance with the invention, the preferred resins or oligomers are provided with difunctional, crosslinking imidophenylamine end caps at each end of the oligomer to impart improved solvent resistance and light crosslinking through addition polymerization upon curing. The oligomers of the invention are characterized by having in the backbone thereof the residue of an ethersulfone dianhydride of the general formula:

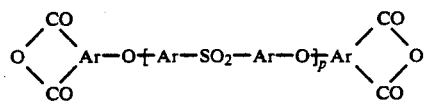

wherein
Ar=an aromatic radical; and
p=a small integer greater than or equal to 1, and generally equal to 1.

Crosslinkable thermoplastic oligomers are formed by mixing together and reacting in a suitable solvent under an inert atmosphere:
1) 2 moles of a difunctional imidophenylamine end cap;
2) n moles of a diamine; and
3) n+1 moles of the dianhydride;
wherein n is selected so that the oligomer has an average formula molecular weight in the range within which the oligomer will possess thermoplastic properties usually between about 5,000 to 40,000, and preferably 5,000 and 15,000.

The difunctional crosslinking imidophenylamine end caps have the formula:

wherein A is selected from the group consisting of:

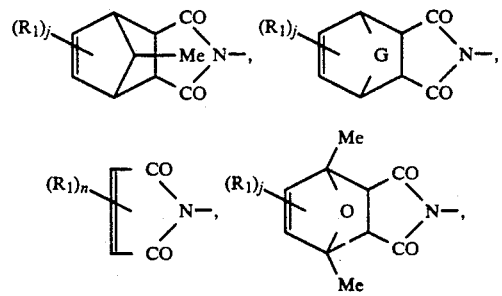

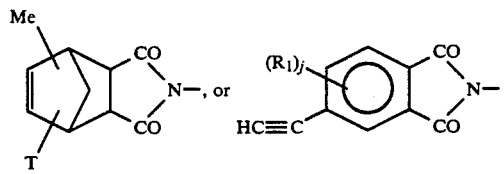

wherein
Me=Methyl;
G=—O—, —SO$_2$—, —CH$_2$—, or —S—;
T=allyl or methallyl;
R$_1$=lower alkoxy, aryl, substituted aryl, lower alkyl, substituted alkyl, aryloxy, or halogen;
i=2; and
j=0, 1 or 2;

These imidophenylamine end caps yield difunctional end caps that provide two crosslinking sites at each end of the oligomer.

Polyimide oligomers in this preferred class exhibit impressive physical and chemical properties which make them particularly attractive for today's marketplace. The starting materials are relatively nonhazardous and nontoxic. Upon condensation, the oligomeric backbone is essentially fully imidized, thereby making the oligomers stable, relatively nonhazardous, and relatively nontoxic. Competing resins, like PMR-15, contain a multitude of amine functionalities (since the prepregs comprise blends of the reactants rather than oligomers), and these resins present handling and storage problems. The oligomers of the present invention are shelf-stable at ambient temperature, thereby eliminating the need for refrigerated storage, a problem which plagues competing polyimide systems. Further, the oligomers remain soluble in conventional prepregging solvents so that the resins can readily be introduced into fabric reinforcements. The sulfone groups along the imide backbone, being strongly electronegative, ensure the solubility of the oligomer. The hydrocarbon unsaturation provided in the end caps provides two sites at each end of the oligomer (i.e. difunctional) for forming lightly crosslinked imide composites that cure at or around conventional, competing imide systems. Yet, these imide systems generally possess higher thermooxidative stability following curing. Finally, the oligomers melt in the temperature range where the crosslinking cure reaction is thermally induced, ensuring processibility of the prepregs to advanced composite materials.

The invention is also directed to multidimensional polyimide oligomers which include an aromatic amine-substituted hub (such as triaminobenzene) and three or more substantially identical radiating arms, each arm including one or more imide linkages and ethersulfone linkages, and a crosslinking imidophenyl amine end cap. Such multidimensional oligomers have improved and higher use temperatures, often well above their curing temperatures, and thereby provide superior advanced composites. These multidimensional oligomers, nevertheless, exhibit processing characteristics comparable to conventional oligomers or resins.

In another aspect, the invention is directed to blends comprised of mixtures of an oligomer and a compatible, noncrosslinking, comparable polymer. The blends often comprise substantially equimolar amounts of the oligomer and polymer, but other ratios (selected to optimize the compromise of properties provided by the blend) are also contemplated. In general, the polymer will have the same backbone structure and length as the oligomer including the identical residues of diamine and dianhydride. The polymers, however, are uncapped and may be quenched with benzoic anhydride or aniline. Blends can be prepared, for example, by mixing miscible solutions of the oligomers and polymers, as we have described in our copending patent applications.

Prepregs comprising the oligomers or blends and a reinforcing additive in fiber or particulate form and composites comprising cured oligomers or blends are the most preferred products of the oligomers and blends of the invention. Varnishes, films, or coatings can also be prepared.

In still another aspect, the invention is directed to the method for improving the thermal stability of composites formed from polyimide oligomers by post-curing the composites at a temperature of approximately 700° F.

DESCRIPTION OF THE PREFERRED EMBODIMENTS

While the present application is focused to a family of polyimide oligomers, prepregs, and composites possessing a superior blend of chemical and physical properties, our initial discussion will address polyimide oligomers of the same general type, along the lines these oligomers are described in our copending application U.S. Ser. No. 07/046,376, now abandoned, which is incorporated by reference.

Monofunctional, crosslinkable, thermoplastic polyimide oligomers are formed by reacting:
1) 2 moles of a monoanhydride end cap;
2) n+1 moles of a diamine having terminal amino groups; and
3) n moles of a dianhydride;

wherein n is selected so that the oligomer has an average molecular weight between 5,000 and 40,000. The reaction usually occurs by mixing all three reactants in a suitable solvent in the presence of an inert atmosphere. Heating the mixture increases the reaction rate. Excess diamine and dianhydride may be provided, although substantially stoichiometric amounts are preferred.

The average molecular weight of the resulting oligomer should be between 5,000 and 40,000 to provide thermoplastic character to the oligomer, but is preferably between about 5,000 and 30,000 and still more preferably between 5,000 and 15,000. Mixtures of oligomers may also be used. For example, an oligomer having a molecular weight of 10,000 may be mixed with one having a molecular weight of 30,000, or an oligomer having a molecular weight of 5,000 may be mixed with one having a molecular weight of 35,000 or 40,000.

Within the preferred range, the oligomers can be crosslinked to form polymers that are relatively easy to process, are tough, have impact resistance, and possess superior thermomechanical properties. When oligomers having molecular weights less than about 5,000 are cured by crosslinking, the thermosetting character of the material is increased so that the ability of the material to be thermoformed is reduced or eliminated.

The monoanhydride preferably has the formula:

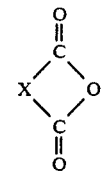

wherein X is selected from the group consisting of:

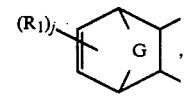

-continued

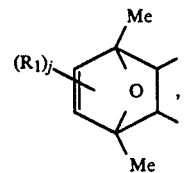

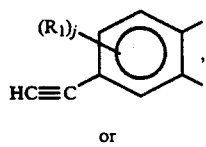

or

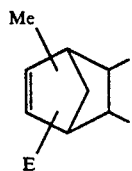

wherein
$R_1$=lower alkyl, lower alkoxy, aryl, substituted alkyl, substituted aryl (including in each case hydroxyl or halo-substituents on replaceable hydrogens), aryloxy, or halogen;
j=0, 1, or 2;
Me=methyl;
G=$-SO_2-$, $-CH_2$, $-S-$, or $-O-$; and
E=methallyl or allyl.

Preferred diamines have the formula:

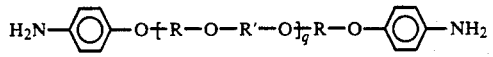

wherein R and R' are aromatic radicals, at least one of R and R' being a diaryl radical wherein the aryl rings are joined by a "sulfone" linkage, and q is an integer from 0 to 27 inclusive. Preferably R is selected from the group consisting of:

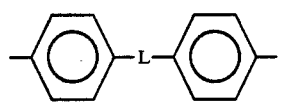

Wherein L=$-SO_2-$, $-(CF_3)_2C-$, or $-S-$. R' is preferably selected from the group consisting of:

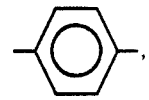

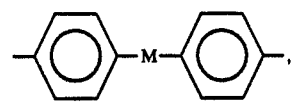

or

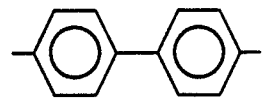

wherein M=$-SO_2-$, $-S-$, $-O-$, $-(CH_3)_2C-$, or $-(CF_3)_2C-$.

Each aryl group may include substituents for the replaceable hydrogens, the substituents being selected from the group consisting of halogen, alkyl groups having 1-4 carbon atoms, and alkoxy groups having 1-4 carbon atoms. Although the para-isomers are shown (and the resulting molecules are linear), meta-isomers may be used to form ribbon-like chains. The isomers (para- and meta-) may be mixed.

Preferred diamines are those in which R is

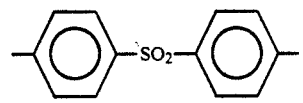

and R' is

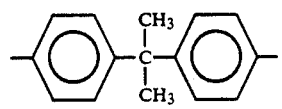

Accordingly, the diamines generally contain at least one phenoxyphenylsulfone group, such as:

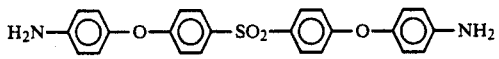

and

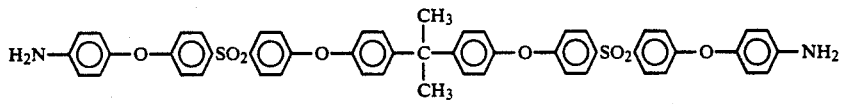

These diamines have alternating ether and "sulfone" linkages, wherein "sulfone" designates an electronegative linkage ($-M-$) as previously defined.

The molecular weights of the preferred aryl diamines described above vary from approximately 500–10,000. The amino groups and other substituents can be positioned either para or meta, as previously discussed. Lower molecular weight diamines are preferred.

In the monofunctional, thermoplastic, crosslinkable oligomers just described, the dianhydride preferably is 5-(2,5-diketotetrahydrofuryl)-3-methyl-3-cyclohexene- 1,2-dicarboxylic anhydride (MCTC), an unsaturated, aliphatic dianhydride.

The diamines and dianhydrides react to form repeating imide linkages along the generally linear backbone of the oligomers. Preferred properties in this oligomer are obtained when the backbone is periodically disrupted by the inclusion of an aliphatic moiety, especially an MCTC residue.

Diamines which include phenoxyphenylsulfone moieties are preferred, since these diamines provide the blend of physical properties in the oligomers which are desired. Impact resistance and toughness is afforded with the "sulfone" linkages which act as joints or swivels between the aryl groups. The aliphatic residues, such as MCTC, provide lower melt temperatures, and allow the use of lower temperature end caps, such as oxynadic and dimethyl oxynadic (DONA) end caps. The resulting oligomers cure at lower temperatures than other solvent-resistant oligomers, have the desirable features of polyimides, and have better solvent-resistance than conventional polyimides, such as those described in U.S. Pat. Nos. 3,998,786 or 3,897,395 (D'Alelio). Of course, they also have lower use temperatures because of their aliphatic components.

Oligomers of the present invention may be used to form prepregs by the conventional method of impregnating a suitable fabric with a mixture of the oligomer and a solvent. Suitable coreactants, such as o-phenylenediamine, benzidine, and 4,4'-methylenedianiline, may be added to the solvent when preparing prepregs, especially those having maleic end caps.

The prepregs may be cured by conventional vacuum bag techniques to crosslink the end caps. Temperatures suitable for curing are in the range of 150°–650° F. The resulting product is a cured, thermally stable, solvent-resistant composite. The crosslinked oligomer may also be used as an adhesive without curing. Such adhesives may be filled, if desired.

The combination of monoanhydride, diamine, and dianhydride for oligomers of the present invention can be selected to achieve an oligomer having a desired thermal stability (use temperature) within a relatively wide range. For example, oxynadic anhydride and dimethyl oxynadic anhydride have lower activation temperatures (generally around 400°–450° F.) and are best suited in oligomers which melt at or near this temperature range. Nadic anhydride or methyl nadic anhydride have intermediate activation temperatures (around 600°–650° F.) and are best suited for use in oligomers with melt (glass transition) temperatures near this range. Acetylenic phenyl anhydrides have higher activation temperatures (around 650°–700° F.) and are, accordingly, preferred for use with the higher melting oligomers. It is important that the oligomer flow near the curing (activation) temperature of the end caps. Use of an unsaturated, aliphatic dianhydride, such as MCTC, with electronegative "sulfone" linkages reduces the melt temperatures sufficiently to allow use of oxynadic anhydride and dimethyl oxynadic anhydride end caps in otherwise aryl sulfone backbone oligomers.

Nadic anhydride end caps can be used with BTDA (benzophenonetetracarboxylic dianhydride). Acetylenic phenyl anhydride end caps can be used with MCTC.

For the thermoplastic regime with melt temperatures of about 200° F. or less, it is important to use an unsaturated, aliphatic dianhydride like MCTC to provide the lowered melt temperature of the oligomer. Although the "sulfone" linkages draw electrons from the stable aromatic rings (and thereby reduce their thermal stability), the lower bond energies associated with aliphatic radicals are important for achieving the desired properties in the monofunctional, crosslinkable, thermoplastic oligomers (prepregs, and composites) of the present invention. The unsaturated carbon-carbon bond of the aliphatic dianhydride residue provides a flat segment of the polyimide between its adjacent imide linkages while the diamine residues include "sulfone" swivels rather than fixed orientations.

Similar oligomers to those just described can also be prepared by condensation of amines, diamines, and dianhydrides, and these oligomers are actually preferred. Difunctional, crosslinkable oligomers can be prepared in this synthesis, thereby improving the solvent-resistance and thermal stability. Such oligomers are synthesized by condensing:
2 moles of an amine end cap;
n moles of a diamine; and
n+1 moles of a dianhydride,
wherein n is selected so that the oligomers exhibit thermoplastic properties, as previously explained.

The amine end caps have the general formula:

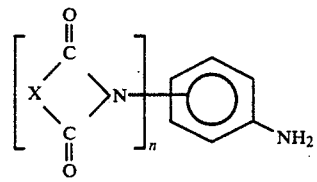

wherein X is as previously defined for the monoanhydrides and n=1 or 2. These amine end caps can be prepared by reacting the monoanhydrides with phenylene diamine or triaminobenzene, or by rearranging an acid amide analog to the desired cap as described in U.S. Ser. No. 07/046,202, now U.S. Pat. No. 4,935,523.

The difunctional crosslinkable oligomers are a new class of polyimides that are believed to exhibit better thermomechanical properties than other capped or uncapped polyimides. When cured, the difunctional caps double the number of crosslinks that form, thereby stabilizing the composites and increasing the solvent resistance.

The difunctional crosslinking polyimides are believed to constitute a broader class of novel oligomers than the corresponding class of monofunctional polyimides. That is, the diamines and dianhydrides for this difunctional class can be drawn from a broader list, and can include, typically, any aromatic or aliphatic diamine or dianhydride. Lower molecular weight aromatic diamines and dianhydrides are preferred.

To this end, the diamine may be selected from the group consisting of:

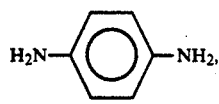
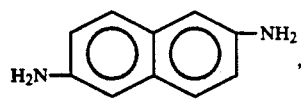
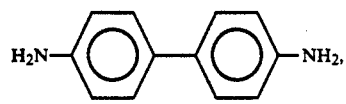
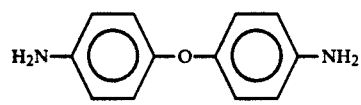
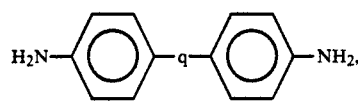
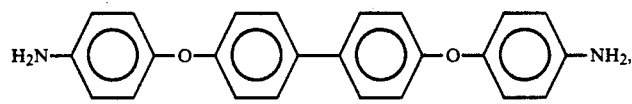
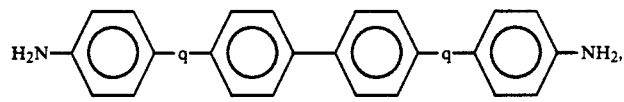
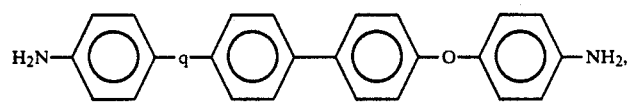
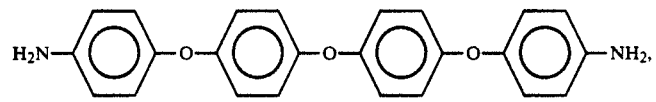
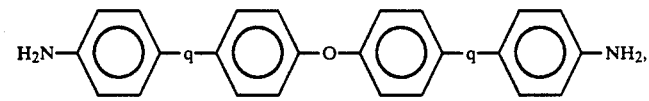
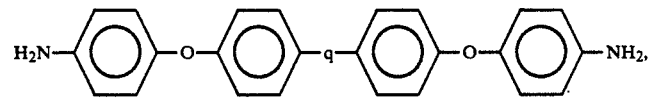
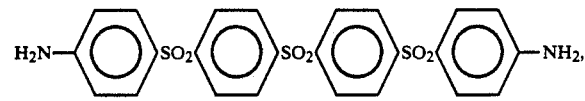
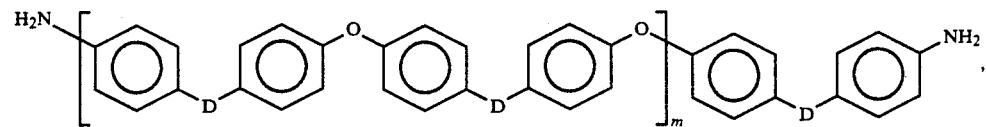

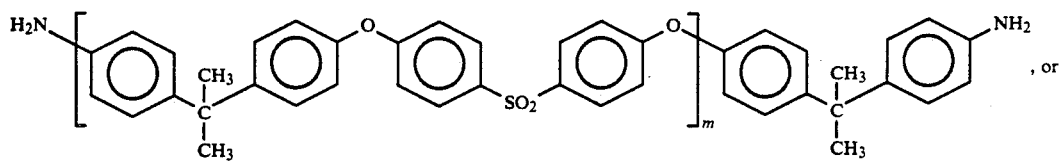

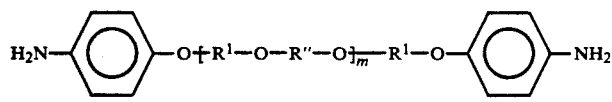

Wherein $R^1$ = 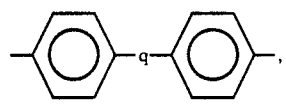 ;

$R''$ =

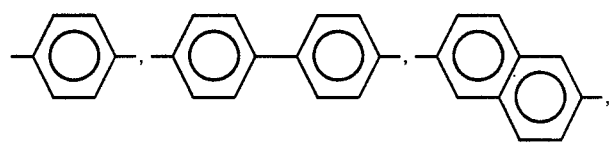

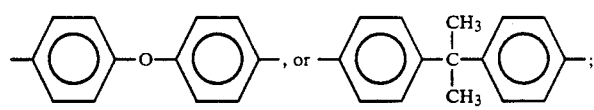

q = —SO$_2$—, —CO—, —S—, or —(CF$_3$)$_2$C—, and preferably —SO$_2$— or —CO—;
Me = methyl;
m = an integer, generally less than 5, and preferably 0 or 1; and
D = any of —CO—, —SO$_2$—, or —(CF$_3$)$_2$C—.

Other diamines that may be used, but that are not preferred, include those described in U.S. Pat. Nos. 4,504,632; 4,058,505; 4,576,857; 4,251,417; and 4,251,418. The aryl or polyaryl ether "sulfone" diamines previously described are preferred, since these diamines provide high thermal stability to the resulting oligomers and composites. Mixtures of diamines might be used.

When the diamine has the formula:

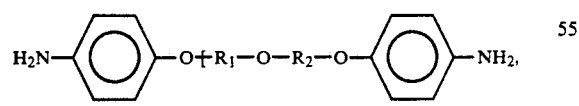

$R_1$ is generally selected from the group consisting of:

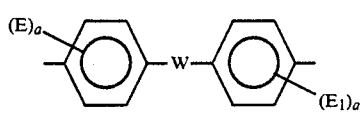

wherein W = —SO$_2$—, —S—, or —(CF$_3$)$_2$C—; and $R_2$ is selected from the group consisting of:

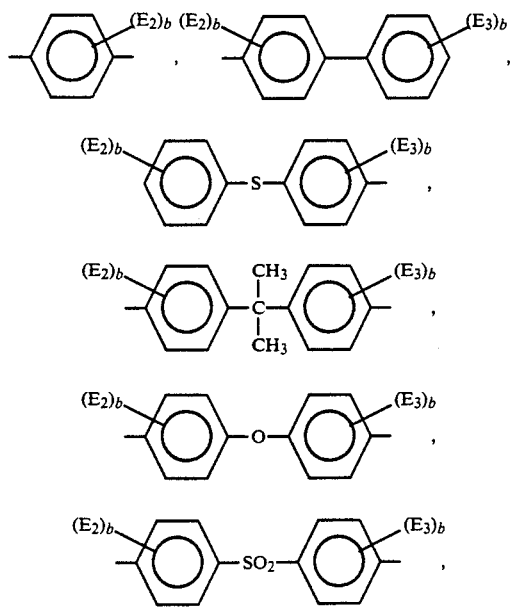

or

-continued

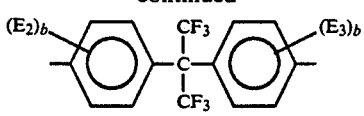

or mixtures thereof, wherein E, $E_1$, $E_2$, and $E_3$ each represent substituents selected from the group consisting of halogen, alkyl groups having 1 to 4 carbon atoms, and alkoxy groups having 1 to 4 carbon atoms, and "a" and "b" are each an integer having a value of 0 to 4.

Particularly preferred compounds are those in which $R_1$ is

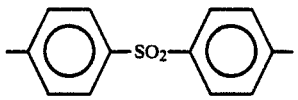

and $R_2$ is

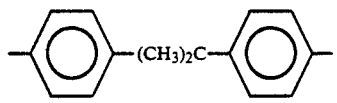

so that the phenoxyphenyl sulfone diamines include:

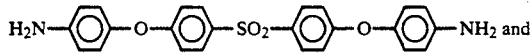

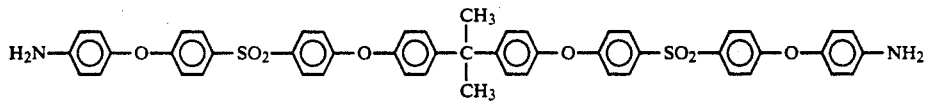

The molecular weights of these diamines can be varied from approximately 500 to about 2000. Using lower molecular weight diamines enhances the mechanical properties of the difunctional polyimide oligomers, each of which preferably has alternating ether "sulfone" segments in the backbones as indicated above.

Phenoxyphenyl sulfone diamines of this general nature can be prepared by reacting two moles of aminophenol with (n+1) moles of an aryl radical having terminal, reactive halide functional groups (dihalogens), such as 4,4'-dichlorodiphenyl sulfone, and n moles of a suitable bisphenol (dihydroxy aryl compounds). The bisphenol is preferably selected from the group consisting of:

2,2-bis-(4-hydroxyphenyl)-propane (i.e., bisphenol-A);
bis-(2-hydroxyphenyl)-methane;
bis-(4-hydroxyphenyl)-methane;
1,1-bis-(4-hydroxyphenyl)-ethane;
1,2-bis-(4-hydroxyphenyl)-ethane;
1,1-bis-(3-chloro-4-hydroxyphenyl)-ethane;
1,1-bis-(3,5-dimethyl-4-hydroxyphenyl)-ethane;
2,2-bis-(3-phenyl-4-hydroxyphenyl)-propane;
2,2-bis-(4-hydroxynaphthyl)-propane;
2,2-bis-(4-hydroxyphenyl)-pentane;
2,2-bis-(4-hydroxyphenyl)-hexane;
bis-(4-hydroxyphenyl)-phenylmethane;
bis-(4-hydroxyphenyl)-cyclohexylmethane;
1,2-bis-(4-hydroxyphenyl)-1,2-bis-(phenyl)-ethane;
2,2-bis-(4-hydroxyphenyl)-1-phenylpropane;
bis-(3-nitro-4-hydrophenyl)-methane;
bis-(4-hydroxy-2,6-dimethyl-3-methoxyphenyl)-methane;
2,2-bis-(3,5-dichloro-4-hydroxyphenyl)-propane;
2,2-bis-(3-bromo-4-hydroxyphenyl)-propane;
or mixtures thereof, as disclosed in U.S. Pat. No. 3,262,914. Bisphenols having aromatic character (i.e., absence of aliphatic segments), such as bisphenol A, are preferred.

The dihalogens in this circumstance preferably are selected from the group consisting of:

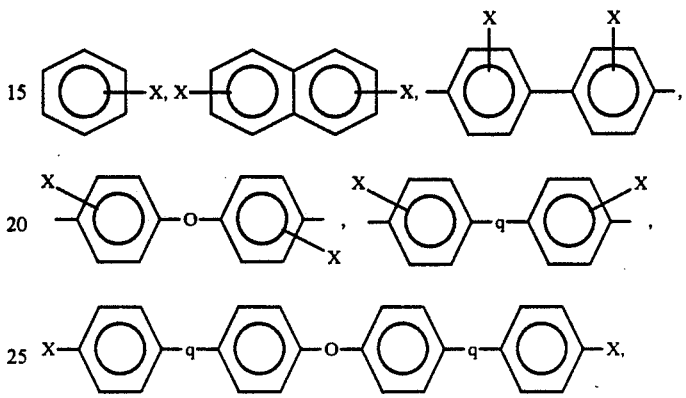

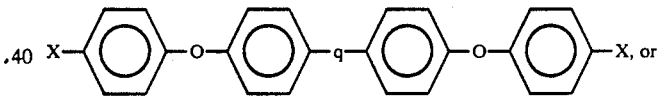

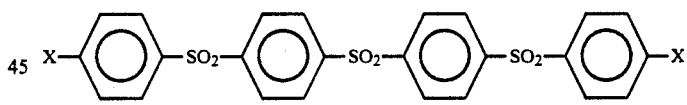

wherein
X=halogen, preferably chlorine; and
q=—S—, —SO$_2$—, —CO—, —(CH$_3$)$_2$C—, and —(CF$_3$)$_2$C—, and preferably either —SO$_2$— or —CO—.

The condensation reaction creates diamine ethers that ordinarily include intermediate "sulfone" linkages. The condensation generally occurs through a phenate mechanism in the presence of $K_2CO_3$ or another base in a DMSO/toluene solvent.

While para isomerization is shown, other isomers are possible. Furthermore, the aryl groups can have substituents, if desired, such as halogen, lower alkyl up to about 4 carbon atoms, lower alkoxy up to about 4 carbon atoms or aryl. Substituents may create steric hindrance problems in synthesizing the oligomers or in crosslinking the oligomers into the final composites.

The grain size of the $K_2CO_3$(s) should fall within the 100–250 ANSI mesh range.

The dianhydride used in the polyimide synthesis preferably is selected from the group consisting of:

(a) phenoxyphenyl sulfone dianhydride;
(b) pyromellitic dianhydride;
(c) benzophenonetetracarboxylic dianhydride (BTDA); and
(d) 5-(2,5-diketotetrahydrofuryl)-3-methylcyclohexene-1,2-dicarboxylic anhydride (MCTC), but may be any aromatic or aliphatic dianhydride, such as those disclosed in U.S. Pat. Nos. 4,504,632; 4,577,034; 4,197,397; 4,251,417; 4,251,418; or 4,251,420. Mixtures of dianhydrides might be used. Lower molecular weight dianhydrides are preferred, and MCTC or other aliphatic dianhydrides are the most preferred for the lower curing difunctional polyimides, as previously described.

Blended oligomers suitable for composites can be made, for example, by blending a substantially equimolar amount of a comparable polymer that is incapable of crosslinking with the crosslinkable oligomers. These blends merge the desired properties of crosslinking oligomers and noncrosslinking polymers to provide tough, yet processible, resin blends. The comparable polymer is usually synthesized by condensing the same diamine of the crosslinking oligomer with the same dianhydride of the crosslinking oligomer and quenching the polymerization with a suitable terminating group. In this way, the comparable oligomer has the identical backbone to that of the crosslinkable oligomer but does not have the crosslinkable end caps. Generally the terminating group will be a simple anhydride, such as benzoic anhydride, added to the diamine and dianhydride to quench the polymerization and to achieve and average formula weight for the comparable oligomer substantially equal to that of the crosslinkable oligomer. The oligomer may have mono- or difunctional crosslinking end caps.

Impact resistance of the cured composites formed from prepregs of the oligomers can be increased without deleterious loss of solvent resistance by forming the prepregs with a blend of capped oligomers to provide crosslinking upon curing and uncapped polymers. A blend of oligomer and polymer is preferably formed by dissolving the capped oligomer in a suitable first solvent, dissolving the uncapped polymer in a separate portion of the same solvent or in a solvent miscible with the first solvent, mixing the two solvent solutions to form a lacquer, and applying the lacquer to fabric in a conventional prepregging process.

Although the polymer in the blend usually has the same length backbone as the oligomer (upon curing), the properties of the composite formed from the blend can be adjusted by altering the ratio of formula weights for the polymer and oligomer. The terminal groups of the polymer are unimportant so long as these groups do not react with or impede the crosslinking of the oligomer end caps. Also, it is probably nonessential that the oligomer and polymer have identical repeating units, but that the oligomer and polymer merely be compatible in the mixed solution or lacquer prior to sweeping out the blend as a prepreg. Of course, if the polymer and oligomer have identical backbones, compatibility in the blend is more likely to occur.

Prepregs of the oligomers or blends can be prepared by conventional techniques. While woven fabrics are the typical reinforcement, the fibers can be continuous or discontinuous (in chopped or whisker form) and may be ceramic, organic, carbon (graphite), or glass, as suited for the desired application.

Composites can be formed by curing the oligomers or prepregs in conventional vacuum bag techniques. The oligomers can also be used as adhesives, varnishes, films, or coatings.

The most preferred linear polyimides are prepared with dianhydrides selected from para- and meta- dianhydrides of the general formula:

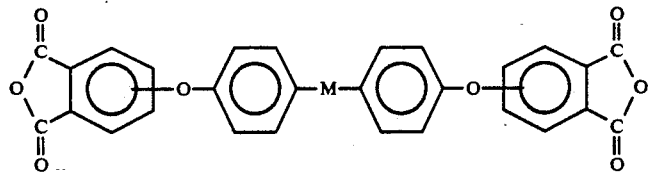

wherein M=—SO$_2$— or —CO—.

Polyimides having multidimensional morphology can be prepared by condensing the diamines, dianhydrides, and end caps with a suitable amine hub, such as triaminobenzene. For example, triaminobenzene can be reacted with the preferred dianhydride just described and any amine end cap to Produce a multidimensional, crosslinkable polyimide possessing mono- or difunctional crosslinking capability. The diamines can be used for chain extension of each arm. Short arms of relatively low formula weight are preferred. The multidimensional oligomers have surprisingly high thermal stabilities upon curing.

Suitable hubs include aromatic compounds having at least three amine functionalities. Such hubs include phenyl, naphthyl, biphenyl, azalinyl amines, (including melamine radicals) or triazine derivatives described in U.S. Pat. No. 4,574,154 of the general formula:

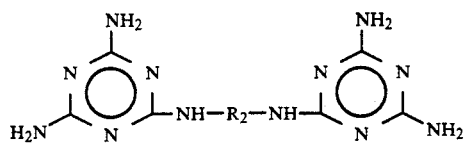

wherein R$_2$ is a divalent hydrocarbon residue containing 1-12 carbon atoms (and, preferably, ethylene).

Additional hubs for these multidimensional polyimides can be prepared by reacting the corresponding hydroxy-substituted hub (such as phloroglucinol) with nitrophthalic anhydride to form trianhydride compounds represented by the formula:

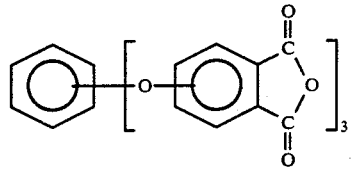

The trianhydride can then be reacted (1) with an amine end cap to form etherimide, multidimensional oligomers or (2) with suitable diamines, dianhydrides, monoanhydride end caps, or amine end caps to form multidimensional polyimides with extended arm lengths.

Yet another class of hubs can be formed by reacting the corresponding halo-hub (such as tribromobenzene) with aminophenol to form triamine compounds represented by the formula:

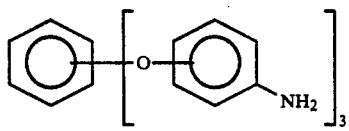

These triamine hubs can be reacted with monoanhydride end caps to form "star" oligomers having three crosslinking sites, or with suitable dianhydrides, mono- or difunctional crosslinking amine end caps, and diamines, if difunctional crosslinking or extended arm lengths are desired. The use of amine end caps allows six crosslinking sites to be incorporated into the ("starburst") oligomers.

Finally, another class of suitable hubs comprises amines having extended arms. For example, tribromobenzene may be mixed with p-aminophenol and 4,4'-dibromodiphenylsulfone and reacted under an inert atmosphere at an elevated temperature to achieve an amino terminated "star" of the general formula:

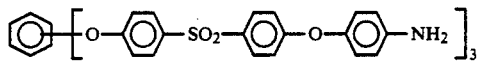

which can be reacted with the end caps; or end caps and dianhydrides; or end caps and dianhydrides and diamines, as desired. Those skilled in the art will recognize the generality of the reaction scheme for preparing a family of extended arm amine hubs.

The best results are likely to occur when the arm length is as short as possible and the oligomer has six crosslinking sites. The most preferred hub includes the phenyl radical, since these compounds are relatively inexpensive, are more readily obtained, and provide oligomers with high thermal stability.

Even higher thermal stabilities than those previously described for the linear polyimides are believed to be achievable with the multidimensional oligomers, particularly with those of the general formula:

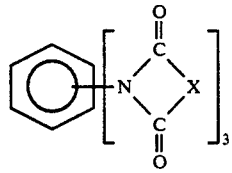

wherein X is as previously defined for the monoanhydrides.

Blends of the multidimensional oligomers are possible, but these compounds are not preferred. Such a blend might include

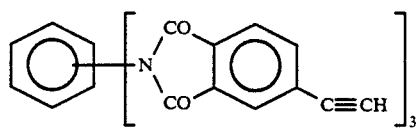

with an equimolar mixture of

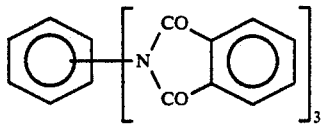

Those skilled in the art will recognize other blends that can be prepared.

Solvent resistant, thermoplastic aromatic poly(imidesulfone) oligomers are also described in U.S. Pat. Nos. 4,398,021 and 4,489,027.

Melt-fusible polyimides made by the condensation of dianhydrides and diamines are described in U.S. Pat. No. 4,485,140.

Now turning to the special family of oligomers of the present invention, the most preferred polymide oligomers are difunctional, crosslinkable, polyimide oligomers formed by the simultaneous condensation of:

(a) 2 moles of a difunctional imidophenylamine end cap;
(b) n moles of a diamine; and
(c) n+1 moles of an ether sulfone dianhydride;

wherein n preferably is selected so that the oligomer has an average formula molecular weight in the range between about 5,000 and 15,000 and possesses thermoplastic properties.

Such difunctional, crosslinkable, polyimide oligomers exhibit a stable shelf life in the prepreg form, even at room temperature, and have acceptable handling and processing characteristics comparable to those of K-3 or PMR-15. They also display comparable shear/compression/tensile properties to PMR-15, and improved toughness, especially when reinforced with sized carbon fibers of high modulus. Advantageously these materials are usable at temperatures of up to 200° C. (400° F.).

The difunctional, crosslinking, imidophenylamine end caps used in preparing such oligomers have the general formula:

wherein A is selected from the group consisting of:

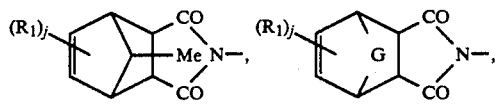

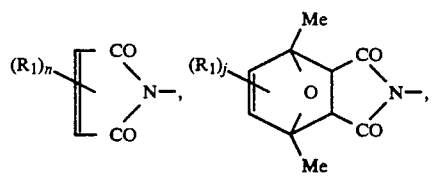

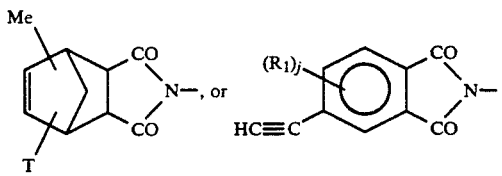

wherein
Me=Methyl;
G=—O—, —SO$_2$—, —CH$_2$—, or —S—;
T=allyl or methallyl;
R$_1$=lower alkoxy, aryl, substituted aryl, lower alkyl, substituted alkyl, aryloxy, or halogen;
i=2; and
j=0, 1 or 2.

The preferred imidophenylamine end caps are those having the formula:

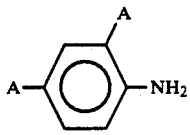

in which A=

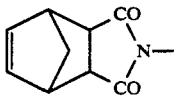

The 3,5-isomer of such an end cap or a mixture of the 2,4- and 3,5-isomers may also be employed.

Difunctional, crosslinking imidophenylamine end caps of the above-noted general formula may be prepared for example, by the method described in copending, coassigned U.S. application Ser. No. 07/046,202, now U.S. Pat. No. 4,935,523.

The dianhydride component of the most preferred polyimide oligomers has the general formula:

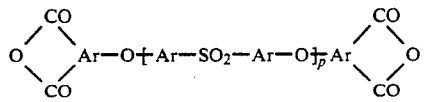

wherein
Ar=an aromatic radical; and
p=a small integer greater than or equal to 1.

The preferred dianhydride is 4,4'-phenoxyphenylsulfone dianhydride, but other ethersulfone dianhydrides of the above class may also be utilized.

The diamine component is a lower alkylene diamine or, a polyaryl diamine having the general formula:

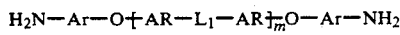

or

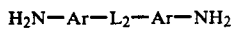

wherein
Ar=an aromatic radical;
L$_1$=a linkage selected from the group consisting of —SO$_2$—, —S—, —CO—, —(CF$_3$)$_2$C—, and —(CH$_3$)$_2$C—;
L$_2$=a linkage selected from the group consisting of —SO$_2$—, —O—, —S—, and —CH$_2$—; and
m=a small integer greater than or equal to 1.
The preferred diamines are 3,3'-phenoxyphenylsulfone diamine, 4,4'-phenoxphenylsulfone diamine, 4,4'-diaminodiphenylsulfone, 4,4'-diaminodiphenyl ether and methylene diamine or mixtures thereof. Particularly preferred is a 50:50 molar mixture of 3,3'-phenoxyphenylsulfone diamine and 4,4'-diaminodiphenylsulfone (available from Ciba-Geigy Corp. under the trade designation "Eporal"). Higher temperature oligomers within the class of preferred oligomers can be prepared using the shorter chain diamines, particularly 4,4'-diaminodiphenylsulfone. The best results may be achievable by replacing the sulfone linkage —SO$_2$— with a smaller linkage such as —O—, —S—, or —CH$_2$—. Although para isomerization is shown above, other isomers of the diamines are possible.

The oligomers are formed by reacting the three reactants in a suitable solvent in the presence of an inert atmosphere. The resultant oligomers have the general formula:

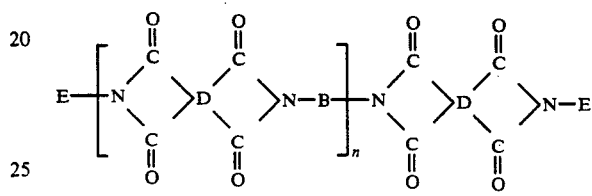

wherein E is the residue of the imidophenylamine end cap component, D is the residue of the dianhydride components, B is the residue of the diamine component and n is selected so that the oligomer is thermoplastic, generally having an average formula molecular weight of between about 5,000 and 15,000. Lower formula molecular weight oligomers in the range of about 5,000 and 10,000 may not be fully imidized, and are, therefore, not the most preferred formulations.

Blends of the preferred difunctional, crosslinkable, polyimide oligomers and a comparable, noncrosslinking polymer prepared from the same diamine and dianhydride of the oligomer or other compatible polymers can be made by blending substantially equimolar amounts of the oligomer and comparable polymer. The compatible polymer can be formed by condensing the same diamine and dianhydride of the oligomer and quenching the polymerization with a suitable terminating group so that the polymer has the same backbone as the crosslinking oligomer but does not have the crosslinkable end caps.

Prepregs of the difunctional, crosslinkable, polyimide oligomers or blends can be prepared by conventional procedures and composites can be formed by curing the oligomers or prepregs by conventional vacuum bag techniques. Such difunctional oligomers can also be used as adhesives, varnishes, films, or coatings.

Multidimensional, polyimide oligomers having difunctional, crosslinkable end caps may also be prepared by reacting an amino-substituted hub such as triaminobenzene with a ethersulfone dianhydride of the above-described class and a difunctional, crosslinkable imidophenylamine end cap of the type described above. The resulting multidimensional, crosslinkable polyimide oligomers have the general formula:

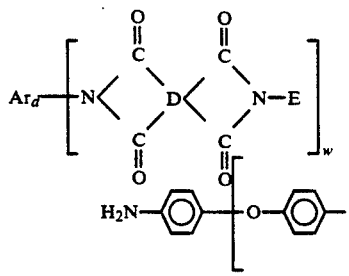

wherein
Ar_d = an aromatic moiety;
w = 2, 3 or 4;
D = the residue of the ethersulfone dianhydride; and
E = the residue of the imidophenylamine end cap.
Preferably, w in the above formula equals 3 so that the multidimensional oligomers has six crosslinking sites thereby providing high thermal stability.

In another aspect of the invention, it has been found that the thermal stability of polyimide oligomers of both the monofunctional and difunctional types described above can be improved by post-curing the composites formed from such oligomers at a temperature of approximately 700° F. Such post-curing treatment advantageously raises the dynamic mechanical analysis peak (and β-transition) of the treated composites, presumably by causing full crosslinking of the end cap functionalities. Preferably, the post-curing treatment of the composites at a temperature of about 700° F. is carried out for a period of approximately 30 minutes, but this period may vary somewhat depending upon the particular composite being treated.

The thermal stabilities achievable with such post-curing treatment are significantly higher than those generally realized without the treatment. For example, for a difunctional polyimide oligomer having a formula molecular weight of about 15,000 and prepared as previously described by reacting a difunctional imidophenylamine end cap, 4,4'-phenoxyphenylsulfone dianhydride and a 50:50 molar mixture of 3,3'-pheno-xyphenylsulfone diamine and 4,4'-diaminodiphenylsulfone, post-curing at a temperature of approximately 700° F. results in a DMA transition temperature of about 350° C., some 40°–50° C. higher than without the post-cure treatment. Similar improvements are realizable with other difunctional and monofunctional polymide oligomers.

In carrying out the post-cure treatment, a prepreg is first formed by impregnating a fabric with a polyimide oligomer. The fabric can be any of the types previously described. The prepreg is heated at an elevated temperature (e.g. 450° F.) and under pressure (e.g. 100 psi) for a time sufficient to cure the prepreg and form a composite. The resulting composite is then post-cured at a temperature of approximately 700° F. for a time sufficient to improve the thermal stability thereof.

The post-curing treatment can also be advantageously carried out on blends of polyimide oligomers and comparable, noncrosslinking polymers and on multidimensional, crosslinkable polymide oligomers and blends.

The following examples are presented to better illustrate various features of the invention.

EXAMPLE 1

Synthesis of

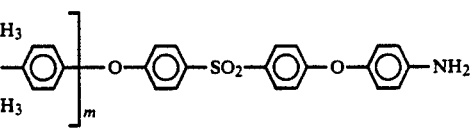

wherein m has an average value greater than 1. (Average Molecular Weight 5000).

In a 1 liter flask fitted with a stirrer, thermometer, Barrett trap, condenser, and N_2 inlet tube, 8.04 g (0.074 moles) p-aminophenol, 86.97 g (0.38 moles) bisphenol A, 281.22 g dimethylsulfoxide (DMSO), and 167.40 g toluene were mixed and stirred. After purging with dry nitrogen, 67.20 g of a 50% solution of sodium hydroxide was added, and the temperature was raised to 110°–120° C. The water was removed from the toluene azeotrope, and then the toluene, until the temperature reached 160° C. The reaction mixture was cooled to 110° C., and 120 g (0.42 moles) 4,4'dichlorodiphenylsulfone as a solid was added. The mixture was reheated to 160° C. and held there for 2 hours. After cooling to room temperature, the mixture was filtered to remove sodium chloride, which precipitated, and the product was coagulated in a blender from a 2% sodium hydroxide solution containing 1% sodium sulfite. The oligomer was recovered from the solution by washing the coagulate with 1% sodium sulfite.

Additional methods for preparing phenoxyphenylsulfones of this general type are disclosed in U.S. Pat. Nos. 3,839,287 and 3,988,374.

EXAMPLE 2

Synthesis of polyimide oligomers using the diamine of Example 1, nadic anhydride, and BTDA. (Average Formula Weight 15,000).

A one liter reaction flask fitted with a stirrer, condenser, thermometer, and a dry N_2 purge was charged with a 60% slurry of 283.64 g (0.057 moles) of the diamine of Example 1 in 189.09 g tetrahydrofuran. In an ice bath, a 10% solution of the mixed anhydrides [6.57 g (0.04 moles) nadic anhydride and 11.84 g (0.03 moles) 3,3'-4,4'-benzophenonetetracarboxylic dianhydride (BTDA)] in 165.61 g tetrahydrofuran was gradually added. After stirring for 15 min. in the ice bath, the bath was removed and stirring continued for 2 hr. The oligomer was recovered thereafter.

The formula weight of the oligomer can be adjusted by adjusting the proportions of reactants and the reaction scheme, as will be known to those of ordinary skill in the art.

EXAMPLE 3

Synthesis of

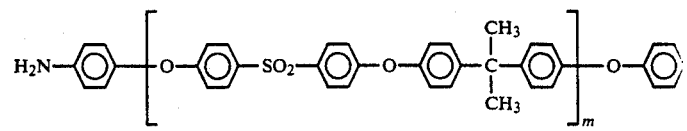

(Average Formula Weight 2,000).

A one liter flask was fitted with a stirrer, thermometer, Barrett trap, condenser, and N₂ inlet tube and charged with 10.91 g (0.1 moles) of p-aminophenol, 40.43 g (0.18 moles) bisphenol A, 168.6 g DMSO, and 79.23 g toluene. After purging with nitrogen, 36.42 g of a 50% solution of sodium hydroxide was added, and the temperature was raised to 110°–120° C. to remove the water from the toluene azeotrope, and then to distill off the toluene until the temperature reached 160° C. The reaction mixture was cooled to 110° C., and 65.22 g (0.23 moles) 4,4′dichlorodiphenylsulfone as a solid was added. The mixture was heated to 160° C. and held there for 2 hours. After cooling to room temperature, the mixture was filtered to remove sodium chloride. A coagulate was formed in a blender by adding 2% sodium hydroxide solution containing 1% sodium sulfite. The coagulate was removed and washed with 1% sodium sulfite.

EXAMPLE 4

Synthesis of polyimide oligomers using the diamine of Example 3, nadic anhydride, and BTDA. (Average Formula Weight 15,000).

The procedure followed in Example 2 was used, except that a suitable amount of diamine of Example 3 was used instead of the diamine of Example 1.

EXAMPLE 5

Synthesis of polyimide oligomers using the diamine of Example 1, nadic anhydride, and a 50:50 mixture of BTDA and MCTC (Average Formula Weight 20,000).

The procedure followed in Example 2 is used, except that a suitable amount of the BTDA and MCTC mixture was used as the dianhydride.

EXAMPLE 6

Synthesis of a diamine of Example 1 (Average Formula Weight of 10,000).

The procedure followed in Example 1 is used, except that 2.18 g (0.02 moles) of p-aminophenol, 49.36 (0.216 moles) of bisphenol A, 64.96 g (0.226 moles) of 4,4′-dichlorodiphenylsulfone were used.

EXAMPLE 7

Synthesis of polyimide oligomers using the diamine of Example 6, nadic anhydride, and MCTC. (Average Formula Weight 20,440).

The procedure followed in Example 2 was used except that the diamine of Example 6, nadic anhydride, and MCTC were used as the reactants.

EXAMPLE 8

The oligomers obtained in Examples 2, 4, 5 and 7 were impregnated on epoxy-sized T300/graphite fabric style (Union Carbide 35 million modulus fiber 24×24 weave) by first obtaining a 10 to 40% solution of resin in tetrahydrofuran. The solutions were then coated onto the dry graphite fabric to form prepregs with 38 wt. % resin. The prepregs were allowed to dry under ambient conditions to less than 1 percent volatile content, were then cut into 6×6-inch pieces, and were stacked to obtain a consolidated composite of approximately 0.080 inch. The stacks of prepregs were then vacuum bagged and consolidated under 100 psi in an autoclave heated for a sufficient time to induce cure. For nadic anhydride capped systems, such as in Examples 2, 4, 5 and 7, the prepregs were cured for 1-2 hours at 650° F. For dimethyl oxynadic anhydride capped systems, the prepregs were cured for 16 hours at 450° F.

EXAMPLE 9

Graphite fabric prepregs, at 36 percent resin solids, were prepared using the resins of Example 2, 4, 5 and 7 by solvent impregnation from dilute tetrahydrofuran solution. The graphite fabric was spread on a release film of FEP. The prepregging solution (having approximately 10–40 wt. % oligomer) was swept into the fabric and allowed to dry. The procedure was repeated on alternating sides of the fabric, until the desired weight of resin had been applied. The prepregs were then dried 2 hours at 275° F. in an air-circulating oven.

Seven piles of each prepreg were stacked, double-wrapped in release-coated 2-mil Kapton film, and sealed in a vacuum bag for curing. Each stack was placed in an autoclave at 200 psi and were heated to about 650° F. at a rate of 5°–6° F./min. Upon reaching 650° F., the temperature was held substantially constant for about 1 hr to complete the cure.

EXAMPLE 10

Samples of the cured composites were machined into 1×0.5-inch coupons and placed in bottles containing methylene chloride. The samples were observed to determine if ply separation would occur. The composites remained intact, with only slight swelling after immersion for up to 2 months.

EXAMPLE 11

Each composite was machined into short beam shear specimens and tested at ambient conditions and 300° F. on a flexure testing fixture using three-point loading with the span being equal to four times the specimen thickness. Results of the testing are reported in Table 1.

TABLE I

| | SUMMARY OF PROPERTIES OBTAINED WITH POLYIMIDE SULFONE OLIGOMERS OF EXAMPLES 2, 4, 5 and 7 | | | |
|---|---|---|---|---|
| Panel Number | Approximate FMW | Resin Used Example # | Shear Strengths RT | ksi at 300 F. |
| 1 | 15,000 | 2 | 6.5 | 7.0 |
| 2 | 15,000 | 4 | 7.06 | 5.79 |
| 3 | 20,000 | 2 | 6.98 | 4.25 |
| | | | 6.53 | 5.87 |
| 4 | 20,000 | 5 | 7.75 | 4.68 |
| 5 | 20,440 | 7 | 6.87 | 5.21 |
| | | | 7.28 | 5.15 |

EXAMPLE 12

Synthesis of high performance polyimide oligomers (Average Formula Weight 15,000).

In a reaction flask maintained under similar reaction conditions to those in Example 1, 3,3′-phenoxyphenylsulfone diamine (SDA), 4,4′-phenoxyphenylsulfone dianhydride, and an end cap amine monomer of the formula:

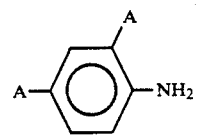

in which A=

*[nadic end cap structure shown]* were condensed and the oligomer product recovered. DMA thermal analyses of carbon fiber Prepregs and composites made from the oligomer showed initial transition temperatures for both the prepreg and composite around 220° C. and a secondary transition (corresponding to the glass transition of the composite) at about 260° C.

EXAMPLES 13-19

Additional high performance polyimide oligomers were synthesized using the nadic imidophenylamine end cap identified in Example 12 with 4,4'-phenoxyphenylsulfone dianhydride and different diamines as set forth in Table II as follows:

TABLE II

|  |  |  | DMA (°C.) | | |
|---|---|---|---|---|---|
|  |  | Prepreg | | Composite | |
|  | FMW | Diamine | T1 | T2 | T1 | T2 |
| 13. | 5,000 | SDA | 197 | ... | ... | ... |
| 14. | 10,000 | SDA | 230 | ... | 220 | 220 |
| 15. | 15,000 | SDA/Eporal* | 240 | ... | 250 | 260 |
| 16. | 15,000 | Eporal | 280 | ... | 319 | 395 |
| 17. | 15,000 | ODA/Eporal/SDA* | 234 | ... | 300 | 343 |
| 18. | 15,000 | Eporal/ODA* | 225 | ... | 281 | 320 |
| 19. | 15,000 | Eporal/PPD* | ... | ... | ... | ... |

FMW = average formula molecular weight
ODA = 4,4'-Oxydianiline
Eporal = 4,4'-diaminodiphenyl sulfone
PPD = 2,2'-phenoxyphenyldiamine
*signifies equal molar proportions of the identified diamines

EXAMPLES 20 AND 21

Composites of the oligomers of Examples 15 and 16 were retested following a post-cure treatment of about 30 min at 700° F. The results are summarized in Table III:

TABLE III

|  | Diamine | Composite DMA (°C.) | |
|---|---|---|---|
|  |  | T1 | T2 |
| 20. | SDA/Eporal | 271 | 327 |
| 21. | Eporal | 352 | 397 |

The post-cure achieved an upward shift in the glass transition of between about 40°-60° C. (about 100° F.), greatly increasing the use temperature for these polyimides.

While preferred embodiments have been described, those skilled in the art will recognize modifications or variations which might be made without departing from the inventive concept. Therefore, the description and claims should be interpreted liberally with only such limitation as is necessary in view of the pertinent prior art.

We claim:

1. A blend comprising a mixture of an oligomer and a comparable, noncrosslinking polymer, the oligomer being the product formed by reacting in a suitable solvent under an inert gas atmosphere a mixture comprising:

(a) two moles of a crosslinkable imidophenylamine end cap having the general formula:

*[structure: $A_1$—phenyl—$NH_2$]* wherein A is selected from the group consisting of:

*[seven end-cap structures shown with R1, G, Me, O, T, and ethynyl substituents]* wherein
Me = methyl;
G = —O—, —SO$_2$—, —CH$_2$—, or —S—;
T = allyl or methallyl;
R$_1$ = lower alkoxy, aryl, substituted aryl, lower alkyl, substituted alkyl, aryloxy, or halogen;
i = 2; and
j = 0, 1 or 2;

(b) an moles of at least one diamine having terminal amine groups and selected from the group consisting of lower alkylene diamines and polyaryl diamines having the general formula:

$$H_2N-Ar-O\{-Ar-L_1-Ar-O\}_m Ar-NH_2$$

or $$H_2N-Ar-L_2-Ar-N_2H$$

wherein
Ar = an aromatic radical;
L$_1$ = a linkage selected from the group consisting of —SO$_2$—, —S—, —CO—, —(CF$_3$)$_2$C—, and —(CH$_3$)$_2$C—;
L$_2$ = a linkage selected from the group consisting of —SO$_2$—, —O—, —S—, and —CH$_2$—; and
m = a small integer greater than or equal to 1;

(c) n+1 moles of at least one dianhydride of the general formula:

*[dianhydride structure: O=C-Ar-O{-Ar-SO$_2$-Ar-O}$_p$ Ar-C=O with anhydride groups]* wherein

Ar=an aromatic radical; and
p=a small integer greater than or equal to 1; and
wherein
n=an integer selected so that the oligomer possesses thermoplastic properties.

2. A blend comprising a mixture of an oligomer and a comparable, noncrosslinking polymer, the oligomer having the general formula:

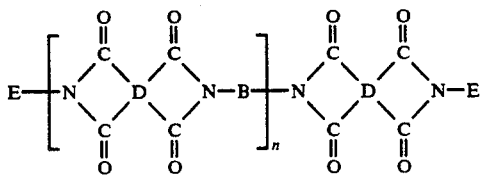

wherein E is the residue of an imidophenylamine end cap having the general formula:

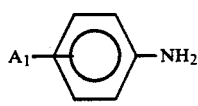

wherein A is selected from the group consisting of:

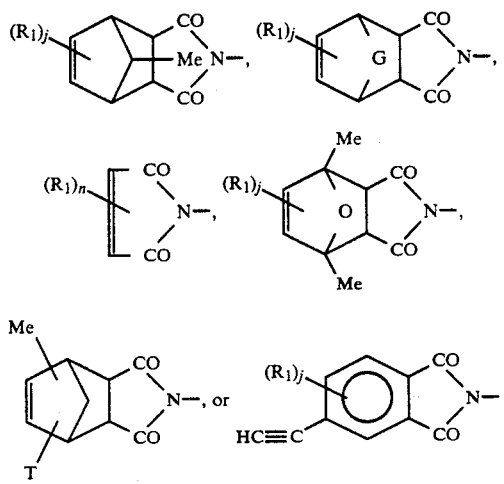

wherein
Me=methyl;
G=—O—, —SO$_2$—, —CH$_2$—, or —S—;
T=allyl or methallyl;
R$_1$=lower alkoxy, aryl, substituted aryl, lower alkyl, substituted alkyl, aryloxy, or halogen;
i=2; and
j=0, 1 or 2;
D is the residue of a dianhydride having the general formula:

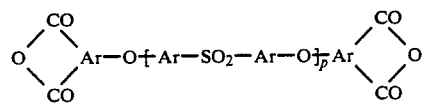

wherein
Ar=an aromatic radical;
p=a small integer greater than or equal to 1; and
B is the residue of a diamine having terminal amine groups and selected from the group consisting of lower alkylene diamines and polyaryl diamines having the general formula:

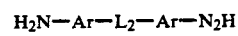

or

H$_2$N—Ar—L$_2$—Ar—N$_2$H wherein
Ar=an aromatic radical;
L$_1$=a linkage selected from the group consisting of —SO$_2$—, —S—, —CO—, —(CF$_3$)$_2$C—, and —(CH$_3$)$_2$C—;
L$_2$=a linkage selected from the group consisting of —SO$_2$—, —O—, —S—, and —CH$_2$—; and
m=a small integer greater than or equal to 1; and
n=a small integer greater than or equal to 1;
the polymer being prepared from the diamine and the dianhydride of the oligomer.

3. A blend comprising a mixture of an oligomer and a comparable non-crosslinking polymer, the oligomer having the general formula:

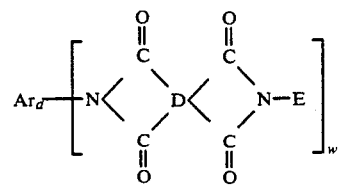

wherein
Ar$_d$=an aromatic moiety; and
w=2, 3 or 4;
D is the residue of a dianhydride having the general formula:

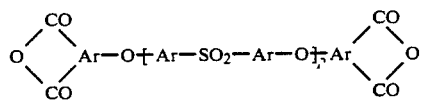

wherein
Ar=an aromatic radical, and
p=a small integer greater than or equal to 1; and
E is the residue of an imidophenylamine end cap having the general formula:

wherein A is selected from the group consisting of:

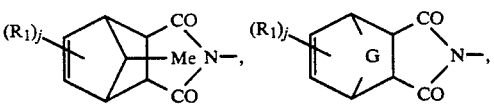

-continued

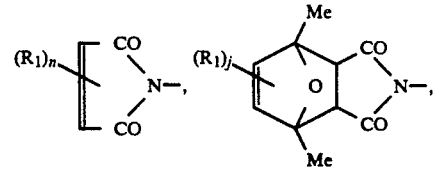

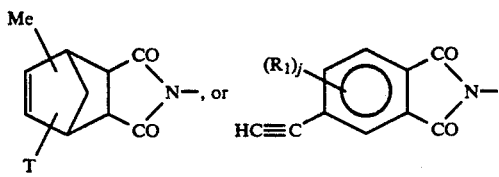

wherein
Me=Methyl;
G=—O—, —SO$_2$—, —CH$_2$—, or —S—;
T=allyl or methallyl;
R$_1$=lower alkoxy, aryl, substituted aryl, lower alkyl, substituted alkyl, aryloxy, or halogen;
i=2; and
j=0, 1 or 2.

4. A prepreg comprising an oligomer and a reinforcing additive in fiber or particulate form, the oligomer being the product formed by reacting in a suitable solvent under an inert gas atmosphere a mixture comprising:
   (a) two moles of a crosslinkable imidophenylamine end cap having the general formula:

wherein A is selected from the group consisting of:

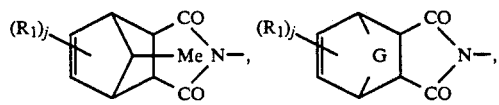

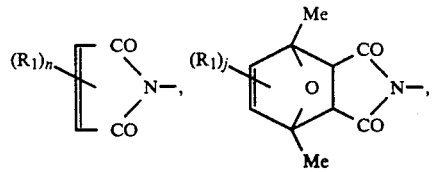

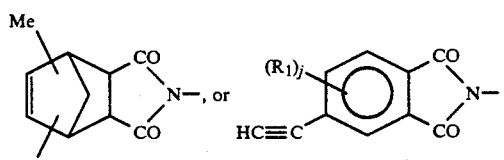

wherein
Me=Methyl;
G=—O—, —SO$_2$—, —CH$_2$—, or —S—;
T=allyl or methallyl;
R$_1$=lower alkoxy, aryl, substituted aryl, lower alkyl, substituted alkyl, aryloxy, or halogen;
i=2; and
j=0, 1 or 2;

(b) n moles of at least one diamine having terminal amine groups and selected from the group consisting of lower alkylene diamines and polyaryl diamines having the general formula:

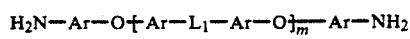

or

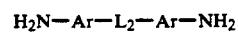

wherein
Ar=an aromatic radical;
L$_1$=a linkage selected from the group consisting of —SO$_2$—, —S—, —CO—, —(CF$_3$)$_2$C—, and —(CH$_3$)$_2$C—;
L$_2$=a linkage selected from the group consisting of —SO$_2$—, —O—, —S—, and —CH$_2$—; and
m=a small integer greater than or equal to 1; and (c) n+1 moles of at least one dianhydride of the general formula:

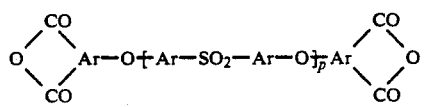

wherein
Ar=an aromatic radical; and
p=a small integer greater than or equal to 1; and
wherein
n=an integer selected so that the oligomer possesses thermoplastic properties.

5. A prepreg comprising a blend and a reinforcing additive in fiber or particulate form, the blend comprising a mixture of an oligomer and a comparable, non-crosslinking polymer, the oligomer being the product formed by reacting in a suitable solvent under an inert gas atmosphere a mixture comprising:
   (a) two moles of a crosslinkable imidophenylamine end cap having the general formula:

wherein A is selected from the group consisting of:

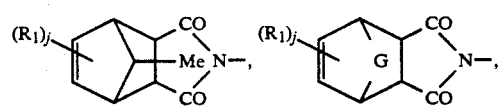

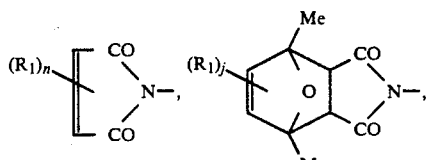

-continued

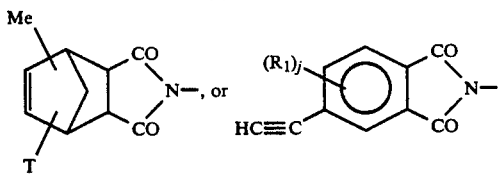

wherein
Me=Methyl;
G=—O—, —SO₂—, —CH₂—, or —S—;
T=allyl or methallyl;
R₁=lower alkoxy, aryl, substituted aryl, lower alkyl, substituted alkyl, aryloxy, or halogen;
i=2; and
j=0, 1 or 2;

(b) n moles of at least one diamine having terminal amine groups and selected from the group consisting of lower alkylene diamines and polyaryl diamines having the general formula:

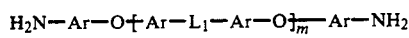

or

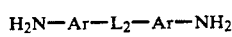

wherein
Ar=an aromatic radical;
L₁=a linkage selected from the group consisting of —SO₂—, —S—, —CO—, —(CF₃)₂C—, and —(CH₃)₂C—;
L₂=a linkage selected from the group consisting of —SO₂—, —O—, —S—, and —CH₂—; and
m=a small integer greater than or equal to 1; and (c) n+1 moles of at least one dianhydride of the general formula:

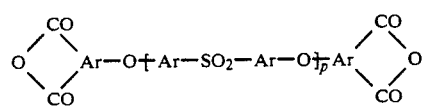

wherein
Ar=an aromatic radical; and
p=a small integer greater than or equal to 1; and
wherein
n=an integer selected so that the oligomer possesses thermoplastic properties.

6. A prepreg comprising an oligomer and a reinforcing additive in fiber or particulate form, the oligomer having the general formula:

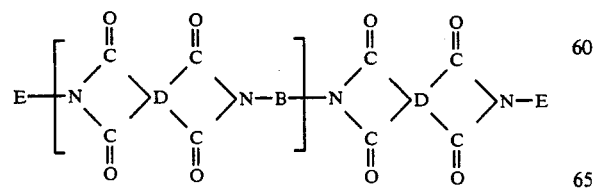

wherein E is the residue of an imidophenylamine end cap having the general formula:

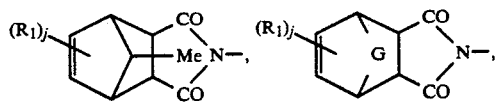

wherein A is selected from the group consisting of:

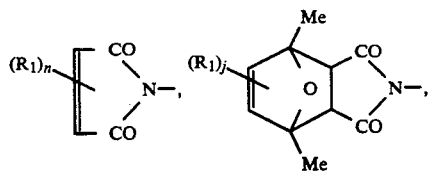

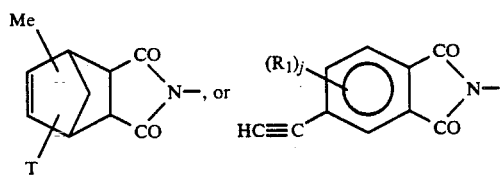

wherein
Me=Methyl;
G=—O—, —SO₂—, —CH₂—, or —S—;
T=allyl or methallyl;
R₁=lower alkoxy, aryl, substituted aryl, lower alkyl, substituted alkyl, aryloxy, or halogen;
i=2; and
j=0, 1 or 2;
D is the residue of a dianhydride having the general formula:

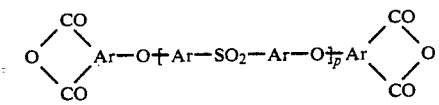

wherein
Ar=an aromatic radical, and
p=a small integer greater than or equal to 1; and
B is the residue of a diamine having terminal amine groups and selected from the group consisting of lower alkylene diamines and polyaryl diamines having the general formula:

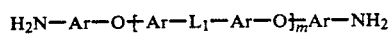

or

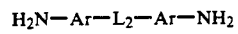

wherein
Ar=an aromatic radical;
L₁=a linkage selected from the group consisting of —SO₂—, —S—, —CO—, —(CF₃)₂C—, and —(CH₃)₂C—;
L₂=a linkage selected from the group consisting of —SO₂—, —O—, —S—, and —CH₂—;
m=a small integer greater than or equal to 1; and
n=a small integer greater than or equal to 1.

7. A prepreg comprising a blend and a reinforcing additive in fiber or particulate form, the blend comprising a mixture of an oligomer and a comparable non-crosslinking polymer, the oligomer having the general formula:

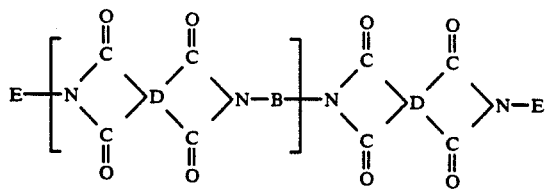

wherein E is the residue of an imidophenylamine end cap having the general formula:

wherein A is selected from the group consisting of:

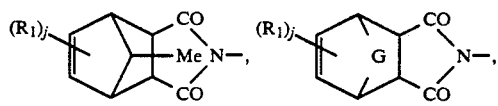

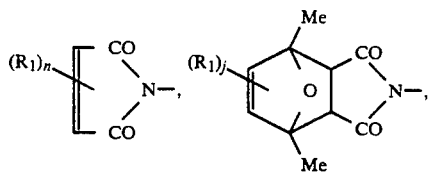

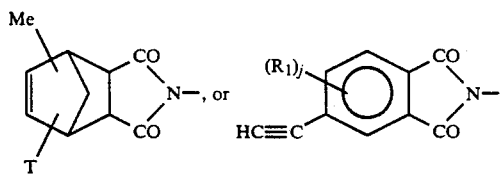

wherein
Me=Methyl;
G=—O—, —SO₂—, —CH₂—, or —S—;
T=allyl or methallyl;
R₁=lower alkoxy, aryl, substituted aryl, lower alkyl, substituted alkyl, aryloxy, or halogen;
i=2; and
j=0, 1 or 2;
D is the residue of a dianhydride having the general formula:

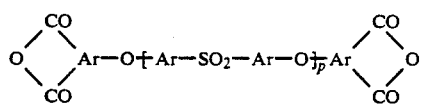

wherein
Ar=an aromatic radical, and
p=a small integer greater than or equal to 1; and
B is the residue of a diamine having terminal amine groups and selected from the group consisting of lower alkylene diamines and polyaryl diamines having the general formula:

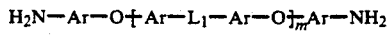

or

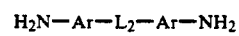

wherein
Ar=an aromatic radical;
L₁=a linkage selected from the group consisting of —SO₂—, —S—, —CO—, —(CF₃)₂C—, and —(CH₃)₂C—;
L₂=a linkage selected from the group consisting of —SO₂—, —O—, —S—, and —CH₂—;
m=a small integer greater than or equal to 1; and
n=a small integer greater than or equal to 1;
the polymer being prepared from the diamine and the dianhydride of the oligomer.

8. A prepreg comprising an oligomer and a reinforcing additive in fiber or particulate form, the oligomer being a multidimensional crosslinkable, polyimide oligomer having the general formula:

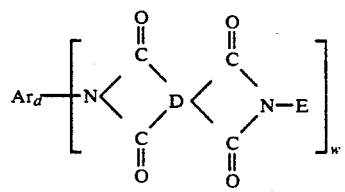

wherein
Ar_d=an aromatic moiety; and
w=2, 3 or 4;
D is the residue of a dianhydride having the general formula:

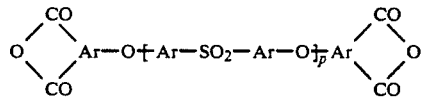

wherein
Ar=an aromatic radical, and
p=a small integer greater than or equal to 1; and
E is the residue of an imidophenylamine end cap having the general formula:

wherein A is selected from the group consisting of:

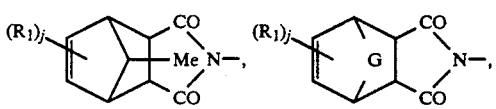

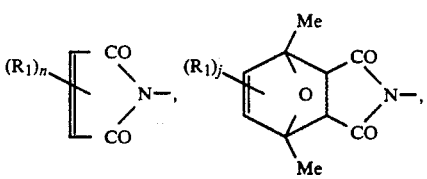

-continued

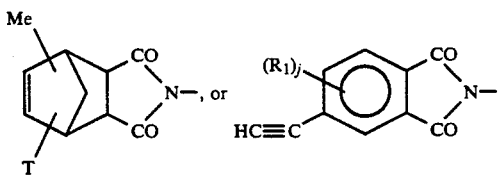

wherein
Me=Methyl;
G=—O—, —SO₂—, —CH₂—, or —S—;
T=allyl or methallyl;
$R_1$=lower alkoxy, aryl, substituted aryl, lower alkyl, substituted alkyl, aryloxy, or halogen;
i=2; and
j=0, 1 or 2.

9. A prepreg comprising the blend of claim 3 and a reinforcing additive in fiber or particulate form.

10. A composite comprising a cured oligomer, the oligomer being the product formed by reacting in a suitable solvent under an inert gas atmosphere a mixture comprising:
   (a) two moles of a crosslinkable imidophenylamine end cap having the general formula:

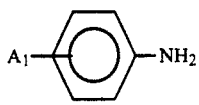

wherein A is selected from the group consisting of:

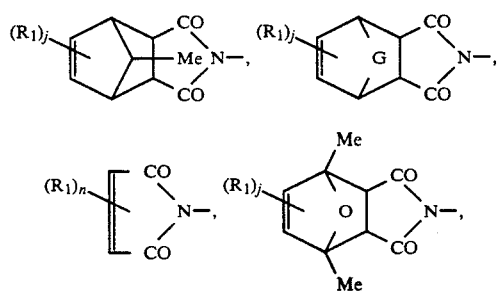

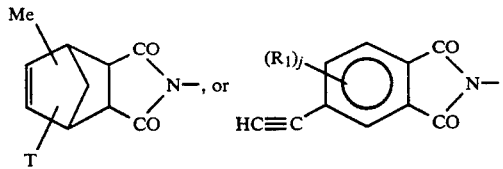

wherein
Me=Methyl;
G=—O—, —SO₂—, —CH₂—, or —S—;
T=allyl or methallyl;
$R_1$=lower alkoxy, aryl, substituted aryl, lower alkyl, substituted alkyl, aryloxy, or halogen;
i=2; and
j=0, 1 or 2;
   (b) n moles of at least one diamine having terminal amine groups and selected from the group consisting of lower alkylene diamines and polyaryl diamines having the general formula:

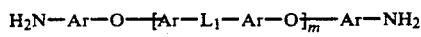

or

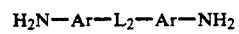

wherein
Ar=an aromatic radical;
$L_1$=a linkage selected from the group consisting of —SO₂—, —S—, —CO—, —(CF₃)₂C—, and —(CH₃)₂C—;
$L_2$=a linkage selected from the group consisting of —SO₂—, —O—, —S—, and —CH₂—; and
m=a small integer greater than or equal to 1;
   (c) n+1 moles of at least one dianhydride of the general formula:

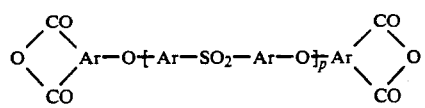

wherein
Ar=an aromatic radical; and
p=a small integer greater than or equal to 1; and
wherein
n=an integer selected so that the oligomer possesses thermoplastic properties.

11. A composite comprising a cured oligomer, the oligomer having the general formula:

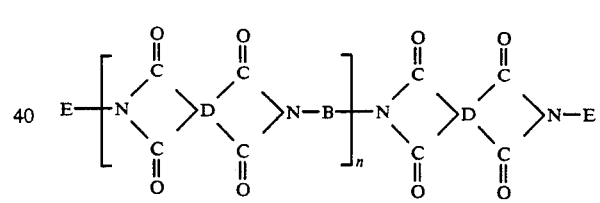

wherein E is the residue of an imidophenylamine end cap having the general formula:

wherein A is selected from the group consisting of:

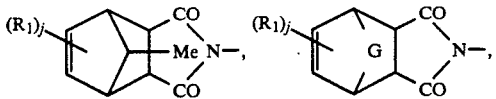

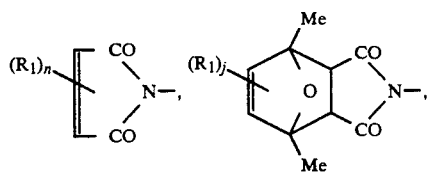

-continued

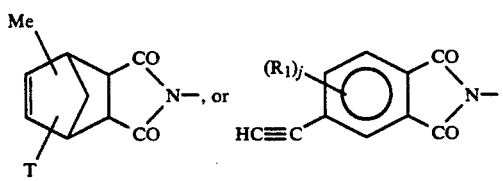

wherein

Me = Methyl;

G = —O—, —SO$_2$—, —CH$_2$—, or —S—;

T = allyl or methallyl;

R$_1$ = lower alkoxy, aryl, substituted aryl, lower alkyl, substituted alkyl, aryloxy, or halogen;

i = 2; and j = 0, 1 or 2;

D is the residue of a dianhydride having the general formula:

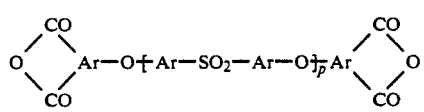

wherein

Ar = an aromatic radical, and p = a small integer greater than or equal to 1; and B is the residue of a diamine having terminal amine groups and selected from the group consisting of lower alkylene diamines and polyaryl diamines having the general formula:

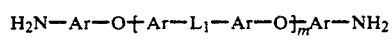

or

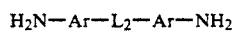

wherein

Ar = an aromatic radical;

L$_1$ = a linkage selected from the group consisting of —SO$_2$—, —S—, —CO—, —(CF$_3$)$_2$C—, and —(CH$_3$)$_2$C—;

L$_2$ = a linkage selected from the group consisting of —SO$_2$—, —O—, —S—, and —CH$_2$—;

m = a small integer greater than or equal to 1; and n = a small integer greater than or equal to 1.

12. A composite comprising a cured oligomer, the oligomer having the general formula:

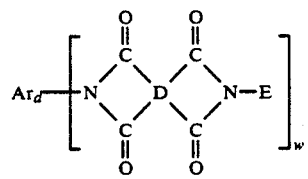

wherein

Ar$_d$ = an aromatic moiety; and w = 2, 3 or 4;

D is the residue of a dianhydride having the general formula:

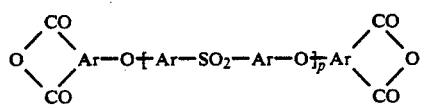

wherein

Ar = an aromatic radical, and p = a small integer greater than or equal to 1; and E is the residue of an imidophenylamine end cap having the general formula:

wherein A is selected from the group consisting of:

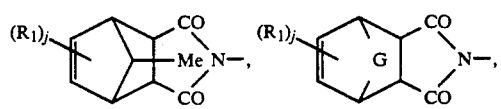

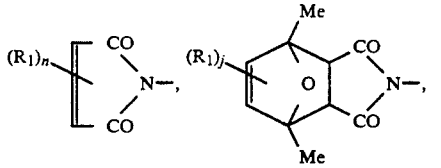

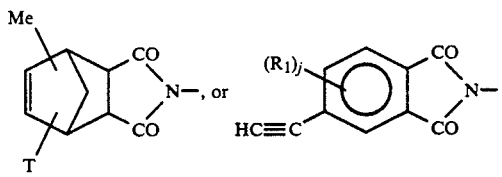

wherein

Me = Methyl;

G = —O—, —SO$_2$—, —CH$_2$—, or —S—;

T = allyl or methallyl;

R$_1$ = lower alkoxy, aryl, substituted aryl, lower alkyl, substituted alkyl, aryloxy, or halogen;

i = 2; and j = 0, 1 or 2.

* * * * *

UNITED STATES PATENT AND TRADEMARK OFFICE
CERTIFICATE OF CORRECTION

PATENT NO. : 5,286,811

DATED : February 15, 1994

INVENTOR(S) : Hyman R. Lubowitz and Clyde H. Sheppard

It is certified that error appears in the above-identified patent and that said Letters Patent is hereby corrected as shown below:

In column 4, line 31,

should read

In column 4, lines 43-46

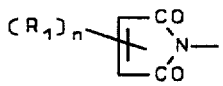

should read

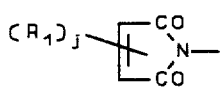

UNITED STATES PATENT AND TRADEMARK OFFICE
CERTIFICATE OF CORRECTION

PATENT NO. : 5,286,811

DATED : February 15, 1994

INVENTOR(S) : Hyman R. Lubowitz and Clyde H. Sheppard

It is certified that error appears in the above-identified patent and that said Letters Patent is hereby corrected as shown below:

In column 20, line 44,

should read

In column 20, lines 55-49

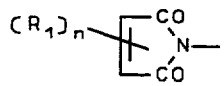

should read

UNITED STATES PATENT AND TRADEMARK OFFICE
CERTIFICATE OF CORRECTION

PATENT NO. : 5,286,811
DATED : February 15, 1994
INVENTOR(S) : Hyman R. Lubowitz and Clyde H. Sheppard It is certified that error appears in the above-identified patent and that said Letters Patent is hereby corrected as shown below:

In column 21, line 64, delete the chemical equation.

In column 24, line 64, should read

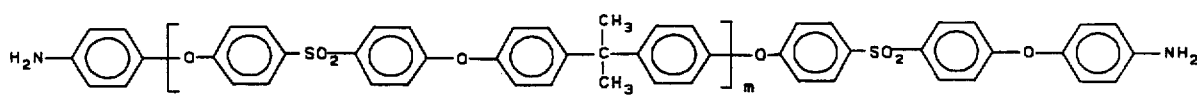

In claim 1, column 28, line 6,

should read

In claim 1, column 28, lines 18-22

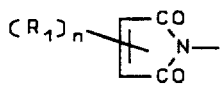

UNITED STATES PATENT AND TRADEMARK OFFICE
CERTIFICATE OF CORRECTION

PATENT NO. : 5,286,811
DATED : February 15, 1994
INVENTOR(S) : Hyman R. Lubowitz and Clyde H. Sheppard It is certified that error appears in the above-identified patent and that said Letters Patent is hereby corrected as shown below:

should read

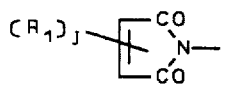

In claim 1, column 28, line 41, "(b) an moles" should read -- (b) n moles --.

In claim 2, column 29, line 23,

should read

In claim 2, column 29, lines 34-38

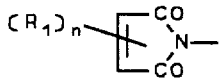

UNITED STATES PATENT AND TRADEMARK OFFICE
CERTIFICATE OF CORRECTION

PATENT NO. : 5,286,811
DATED : February 15, 1994
INVENTOR(S) : Hyman R. Lubowitz and Clyde H. Sheppard It is certified that error appears in the above-identified patent and that said Letters Patent is hereby corrected as shown below:

should read

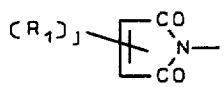

In claim 3, column 30, line 57,

should read

In claim 3, column 31, lines 3-8

should read

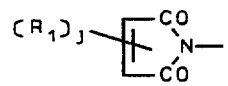

UNITED STATES PATENT AND TRADEMARK OFFICE
CERTIFICATE OF CORRECTION

PATENT NO. : 5,286,811
DATED : February 15, 1994
INVENTOR(S) : Hyman R. Lubowitz and Clyde H. Sheppard It is certified that error appears in the above-identified patent and that said Letters Patent is hereby corrected as shown below:

In claim 4, column 31, line 36,

should read

In claim 4, column 31, lines 48-52

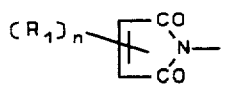

should read

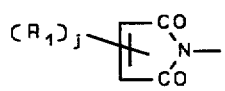

In claim 5, column 32, line 50,

UNITED STATES PATENT AND TRADEMARK OFFICE
CERTIFICATE OF CORRECTION

PATENT NO. : 5,286,811
DATED : February 15, 1994
INVENTOR(S) : Hyman R. Lubowitz and Clyde H. Sheppard It is certified that error appears in the above-identified patent and that said Letters Patent is hereby corrected as shown below:

should read

In claim 5, column 32, lines 63-67

should read

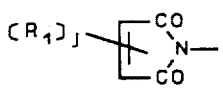

In claim 6, column 33, line 58-65

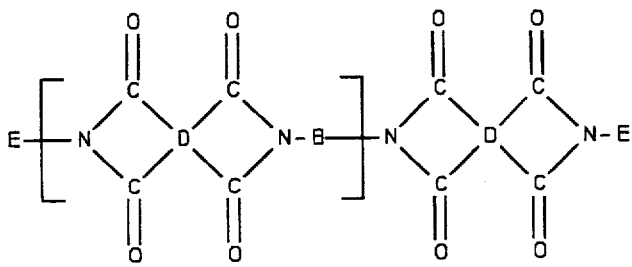

UNITED STATES PATENT AND TRADEMARK OFFICE
CERTIFICATE OF CORRECTION

PATENT NO. : 5,286,811  
DATED : February 15, 1994  
INVENTOR(S) : Hyman R. Lubowitz and Clyde H. Sheppard It is certified that error appears in the above-identified patent and that said Letters Patent is hereby corrected as shown below:

should read

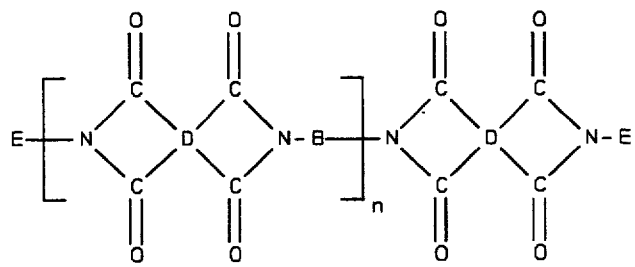

In claim 6, column 34, line 4,

should read

In claim 6, column 34, lines 16-19,

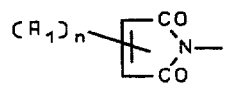

UNITED STATES PATENT AND TRADEMARK OFFICE
CERTIFICATE OF CORRECTION

PATENT NO. : 5,286,811
DATED : February 15, 1994
INVENTOR(S) : Hyman R. Lubowitz and Clyde H. Sheppard It is certified that error appears in the above-identified patent and that said Letters Patent is hereby corrected as shown below:

should read

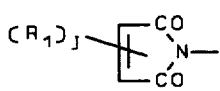

In claim 7, column 35, line 8-13,

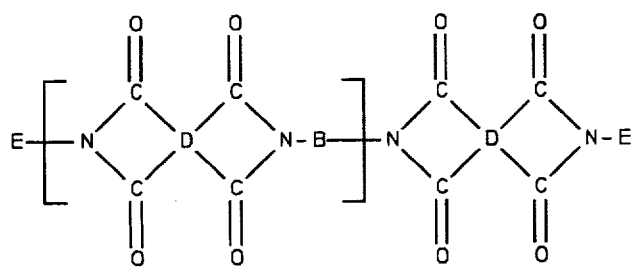

should read

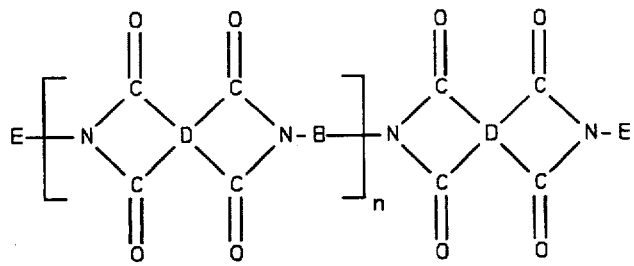

UNITED STATES PATENT AND TRADEMARK OFFICE
CERTIFICATE OF CORRECTION

PATENT NO. : 5,286,811
DATED : February 15, 1994
INVENTOR(S) : Hyman R. Lubowitz and Clyde H. Sheppard It is certified that error appears in the above-identified patent and that said Letters Patent is hereby corrected as shown below:

In claim 7, column 35, line 21,

should read

In claim 7, column 35, lines 33-36,

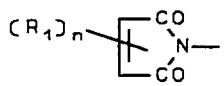

should read

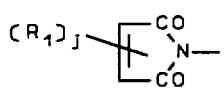

In claim 8, column 36, line 53,

UNITED STATES PATENT AND TRADEMARK OFFICE
CERTIFICATE OF CORRECTION

PATENT NO. : 5,286,811

DATED : February 15, 1994

INVENTOR(S) : Hyman R. Lubowitz and Clyde H. Sheppard

It is certified that error appears in the above-identified patent and that said Letters Patent is hereby corrected as shown below:

should read

In claim 8, column 36, lines 63-67,

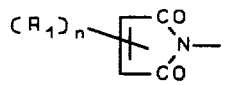

should read

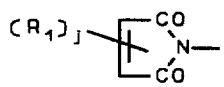

In claim 10, column 37, line 30,

should read

UNITED STATES PATENT AND TRADEMARK OFFICE
CERTIFICATE OF CORRECTION

PATENT NO. : 5,286,811
DATED : February 15, 1994
INVENTOR(S) : Hyman R. Lubowitz and Clyde H. Sheppard It is certified that error appears in the above-identified patent and that said Letters Patent is hereby corrected as shown below:

In claim 10, column 37, lines 43-46,

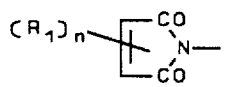

should read

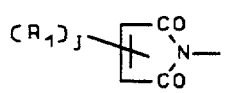

In claim 11, column 38, line 50,

should read

In claim 11, column 38, lines 63-67,

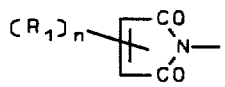

UNITED STATES PATENT AND TRADEMARK OFFICE
CERTIFICATE OF CORRECTION

PATENT NO. : 5,286,811

DATED : February 15, 1994

INVENTOR(S) : Hyman R. Lubowitz and Clyde H. Sheppard

It is certified that error appears in the above-identified patent and that said Letters Patent is hereby corrected as shown below:

should read

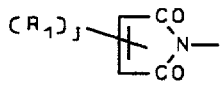

In claim 12, column 40, line 29,

should read

In claim 12, column 40, lines 40-44,

UNITED STATES PATENT AND TRADEMARK OFFICE
CERTIFICATE OF CORRECTION

PATENT NO. : 5,286,811
DATED : February 15, 1994
INVENTOR(S) : Hyman R. Lubowitz and Clyde H. Sheppard It is certified that error appears in the above-identified patent and that said Letters Patent is hereby corrected as shown below:

should read

Signed and Sealed this

Eighteenth Day of April, 1995

Attest:

BRUCE LEHMAN

Attesting Officer

Commissioner of Patents and Trademarks